(12) United States Patent
AlNasser et al.

(10) Patent No.: US 9,904,830 B2
(45) Date of Patent: *Feb. 27, 2018

(54) CONVERTIBLE HANDHELD READER DEVICE

(71) Applicant: Practech, Inc., San Francisco, CA (US)

(72) Inventors: Khalid A. AlNasser, San Francisco, CA (US); Ibrahim O. AlGwaiz, San Francisco, CA (US); Mohammad A. AlGassim, Riyadh (SA)

(73) Assignee: PRACTECH, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,792

(22) Filed: Jun. 14, 2017

(65) Prior Publication Data

US 2017/0286729 A1  Oct. 5, 2017

Related U.S. Application Data

(63) Continuation of application No. 15/165,956, filed on May 26, 2016, now Pat. No. 9,740,906, and a
(Continued)

(51) Int. Cl.
*G06K 7/10* (2006.01)
*H04W 4/00* (2018.01)
(Continued)

(52) U.S. Cl.
CPC ..... *G06K 7/10891* (2013.01); *G04B 37/1486* (2013.01); *G04G 17/08* (2013.01);
(Continued)

(58) Field of Classification Search
CPC ........... G06K 7/10881; G06K 7/10891; G06K 7/10851; G06K 17/0022; G06K 7/10772
(Continued)

(56) References Cited

U.S. PATENT DOCUMENTS

| 5,319,185 A | 6/1994 | Obata |
| 6,556,222 B1 | 4/2003 | Narayanaswami |

(Continued)

FOREIGN PATENT DOCUMENTS

| CN | 102866623 A | 1/2013 |
| CN | 202748604 U | 2/2013 |

(Continued)

OTHER PUBLICATIONS

NookaStyle, "Nooka 360", Youtube, Jul. 26, 2011, accessed Nov. 19, 2015, <https://www.youtube.com/watch?v=Sk7ee3UUcQ4>; accessed Nov. 19, 2015 <http://www.nooka.com/shop/nooka-watches/nooka-360/360-night-watch/>.

*Primary Examiner* — Karl D Frech
(74) *Attorney, Agent, or Firm* — Sang Ho Lee; Novick, Kim & Lee, PLLC

(57) ABSTRACT

A convertible handheld reader device is provided. The convertible handheld reader device includes a network assembly comprising a network component and a computing component, at least one reader coupled to the computing component and reading at least one of a barcode or Radio-frequency identification (RFID), a wearable wrist band unit having a first wrist band unit and a second wrist band unit, wherein each of the first wrist band unit and the second wrist band unit is coupled to the network assembly, the first wrist band unit is extended in a different direction from the second wrist band unit. The first wrist band unit has an attachment component and the attachment component is detachably attached to one of the network assembly and the second wrist band unit. When the attachment component is attached to one of the network assembly and the second wrist band unit, a structure of the first wrist band, the network assembly, and the second wrist band is converted from a wearable position to a handheld position.

20 Claims, 46 Drawing Sheets

Related U.S. Application Data continuation-in-part of application No. 14/242,627, filed on Apr. 1, 2014, which is a continuation of application No. 14/088,894, filed on Nov. 25, 2013, now Pat. No. 8,725,842.

(60) Provisional application No. 62/166,525, filed on May 26, 2015, provisional application No. 61/845,322, filed on Jul. 11, 2013.

(51) Int. Cl.

| | | |
|---|---|---|
| *G06F 21/31* | (2013.01) | |
| *G04G 17/08* | (2006.01) | |
| *G06Q 10/08* | (2012.01) | |
| *G06F 1/16* | (2006.01) | |
| *G04B 37/14* | (2006.01) | |
| *G06F 3/0354* | (2013.01) | |
| *H04M 19/04* | (2006.01) | |
| *G04G 21/04* | (2013.01) | |
| *H04M 1/725* | (2006.01) | |
| *G04G 21/08* | (2010.01) | |
| *G06F 3/0488* | (2013.01) | |
| *G04G 21/02* | (2010.01) | |
| *G06Q 10/10* | (2012.01) | |
| *G06Q 50/00* | (2012.01) | |

(52) U.S. Cl.
CPC .......... *G04G 21/025* (2013.01); *G04G 21/04* (2013.01); *G04G 21/08* (2013.01); *G06F 1/163* (2013.01); *G06F 1/1686* (2013.01); *G06F 1/1698* (2013.01); *G06F 3/03547* (2013.01); *G06F 3/04883* (2013.01); *G06F 21/31* (2013.01); *G06K 7/10009* (2013.01); *G06Q 10/08* (2013.01); *H04M 1/7253* (2013.01); *H04M 19/04* (2013.01); *H04W 4/008* (2013.01); *G06F 2203/0339* (2013.01); *G06Q 10/109* (2013.01); *G06Q 50/01* (2013.01); *H04M 2250/04* (2013.01); *H04M 2250/12* (2013.01); *H04M 2250/52* (2013.01)

(58) Field of Classification Search
USPC ............ 235/462.44, 462.45, 472.01, 472.02, 235/472.03
See application file for complete search history.

(56) References Cited

U.S. PATENT DOCUMENTS

| | | |
|---|---|---|
| 6,619,835 B2 | 9/2003 | Kita |
| 7,439,962 B2 | 10/2008 | Reynolds et al. |
| 7,471,199 B2 | 12/2008 | Zimmerman et al. |
| 7,559,688 B2 | 7/2009 | Robert-Nicoud et al. |
| 7,946,758 B2 | 5/2011 | Mooring |
| 8,098,141 B2 | 1/2012 | Vanska et al. |
| 8,279,716 B1 | 10/2012 | Gossweiler, III et al. |
| 8,328,055 B1 | 12/2012 | Snyder |
| 8,854,925 B1 | 10/2014 | Lee et al. |
| 9,016,565 B2 | 4/2015 | Zhou |
| 9,740,906 B2 * | 8/2017 | AlNasser ........... G06K 7/10891 |
| 2005/0248542 A1 | 11/2005 | Sawanobori |
| 2006/0018202 A1 | 1/2006 | Girardin et al. |
| 2006/0073851 A1 | 4/2006 | Colando et al. |
| 2008/0177751 A1 | 7/2008 | Tan |
| 2011/0003665 A1 | 1/2011 | Burton et al. |
| 2011/0205851 A1 | 8/2011 | Harris |
| 2011/0219427 A1 | 9/2011 | Hito et al. |
| 2012/0221659 A1 | 8/2012 | Brown et al. |
| 2013/0072765 A1 | 3/2013 | Kahn et al. |
| 2013/0146659 A1 | 6/2013 | Zhou et al. |
| 2013/0158369 A1 | 6/2013 | Yuen et al. |
| 2013/0222405 A1 | 8/2013 | Ademar et al. |
| 2013/0268292 A1 | 10/2013 | Kim et al. |
| 2014/0125491 A1 | 5/2014 | Park et al. |
| 2014/0172313 A1 | 6/2014 | Rayner |

FOREIGN PATENT DOCUMENTS

| | | |
|---|---|---|
| CN | 103135440 A | 6/2013 |
| WO | 2008138086 A1 | 11/2008 |

* cited by examiner

| INPUT TYPE | GPS | BARCODE | QR CODE | BUSINESS CARD | MOTION |
|---|---|---|---|---|---|
| BLUETOOTH/ NFC | BLUETOOTH | BLUETOOTH | BLUETOOTH | NFC | BLUETOOTH |

FIG. 23

CONVERTIBLE HANDHELD READER DEVICE

CROSS-REFERENCE TO RELATED APPLICATIONS

The present application is a Continuation application of U.S. patent application Ser. No. 15/165,956, filed on May 26, 2016, which claims priority from Provisional U.S. Patent Application Ser. No. 62/166,525, filed on May 26, 2015, and which is a Continuation-In-Part application of U.S. patent application Ser. No. 14/242,627, filed on Apr. 1, 2014, which in turn is a Continuation application of U.S. patent application Ser. No. 14/088,894, filed on Nov. 25, 2013, (now U.S. Pat. No. 8,725,842) and claims priority from Provisional U.S. Patent Application Ser. No. 61/845,322 filed on Jul. 11, 2013, and the entire contents of the US applications mentioned above are incorporated herein by reference.

FIELD OF THE DISCLOSURE

The present disclosure relates to a convertible handheld reader device and more particularly relates to a convertible handheld reader device which can scan or read a barcode, QR code or RFID.

BACKGROUND OF THE DISCLOSURE

The background of the disclosure section is merely to present the context of the disclosure and the known problems and difficulties of the prior art. However, the statements herein are not admitted as prior art against the present disclosure.

Various wearable devices have been developed and used in our daily life. Smart-phones and wearable devices have widely spread and smart-bands are also available for fitness purposes.

At the same time, Barcodes, QR codes, and RFID technologies are conventionally used to record and transmit data. However, few wearable devices have been developed to work together with such barcodes, QR codes, or RFID technologies for business management such as medical or inventory fields.

In particular, within the medical field, most drug containers have surface labels with a barcode identifying the contents. If wearable devices can provide an efficient solution for managing patients' prescriptions with barcode technology, it can bring about huge changes. Although some portable scanners are conventionally available, few wearable devices have been known for providing a systematic solution for tracking the barcode with a optimized mechanical structure which is suitable for reading such barcode information.

To solve this problem, a wearable device is required, which is suitable for convenient scanning of a barcode, QR code or Radio Frequency Identification (RFID) information with a systematic management solution.

SUMMARY OF THE DISCLOSURE

Accordingly, the present disclosure is directed to a convertible handheld reader device obviates one or more problems due to limitations and disadvantages of the related art.

In one embodiment, an object of the disclosure is to provide a convertible handheld reader device. The convertible handheld reader device includes a network assembly having a network component and a computing component, at least one reader coupled to the computing component and reading at least one of a barcode or Radio-frequency identification (RFID), a wearable wrist band unit having a first wrist band unit and a second wrist band unit, each of the first wrist band unit and the second wrist band unit is coupled to the network assembly, the first wrist band unit is extended in a different direction from the second wrist band unit. The first wrist band unit has an attachment component and the attachment component is detachably attached to one of the network assembly and the second wrist band unit. When the attachment component is attached to one of the network assembly and the second wrist band unit, a structure of the first wrist band, the network assembly, and the second wrist band is converted from a wearable position to a handheld position.

The network assembly may be detachably attached to the wearable wrist band unit. The network assembly may be rotatably attached to the wearable wrist band unit. The at least one reader may be detachably attached to the network assembly. The at least one reader wirelessly communicates with the network assembly. The at least one reader may have a holder, and a user holds the at least one reader on a user's finger with the holder. The at least one reader may automatically recognize a barcode when the at least one reader reads the barcode. The at least one reader automatically recognizes a barcode when the at least one reader reads the barcode for a predetermined period of time. The wearable wrist band unit has a button to activate the at least one reader. The at least one reader includes at least one first reader and at least one second reader and the at least one first reader is disposed at the network assembly and the at least one second reader is disposed at the wearable wrist band unit. The at least one reader may include a plurality of readers, and the plurality of readers are disposed at the network assembly. The at least one reader includes a plurality of readers and the plurality of readers are disposed at the wearable wrist band unit. The at least one reader includes a plurality of three-dimensional scanners. The at least one reader may be disposed to face in a tangential direction to a surface of the wrist band unit.

The first wrist band unit is disposed to face the at least one reader and the first wrist band unit has an opening corresponding to the at least one reader. The attachment component is detachably attached to the network assembly to form a loop that a user can put a finger therein. The attachment component is detachably attached to a middle of the second wrist band unit. Each and every one of the first wrist band, the network assembly, and the second wrist band defines the convertible handheld reader device in a handgun-shape.

In another embodiment, the convertible handheld reader device is provided, the convertible handheld reader device includes a network assembly having a network component and a computing component, at least one reader coupled to the computing component and reading at least one of barcode or RFID, a wearable wrist band unit having a first wrist band unit and a second wrist band unit. The first wrist band unit is extended in opposite direction from the second wrist band unit, and accommodates the network assembly. The at least one reader is detachably attached to the network assembly. The at least one reader wirelessly communicates with the network assembly. The at least one reader has a holder that a user holds the at least one reader on a user's finger. The first wrist band unit has an attachment component and the attachment component is detachably attached to one of the network assembly and the second wrist band unit, and when the attachment component is attached to one of the network assembly and the second wrist band unit, a structure of the first wrist band, the network assembly, and the second wrist band is converted from a wearable position to a handheld position. The computing component includes a memory and a processor. The network component has an internet connection unit.

BRIEF DESCRIPTION OF THE DRAWINGS

FIG. 23 is a table of signal types used for various input/output devices;

FIG. 1)

DETAILED DESCRIPTION OF THE PREFERRED EMBODIMENTS

Figure 1:
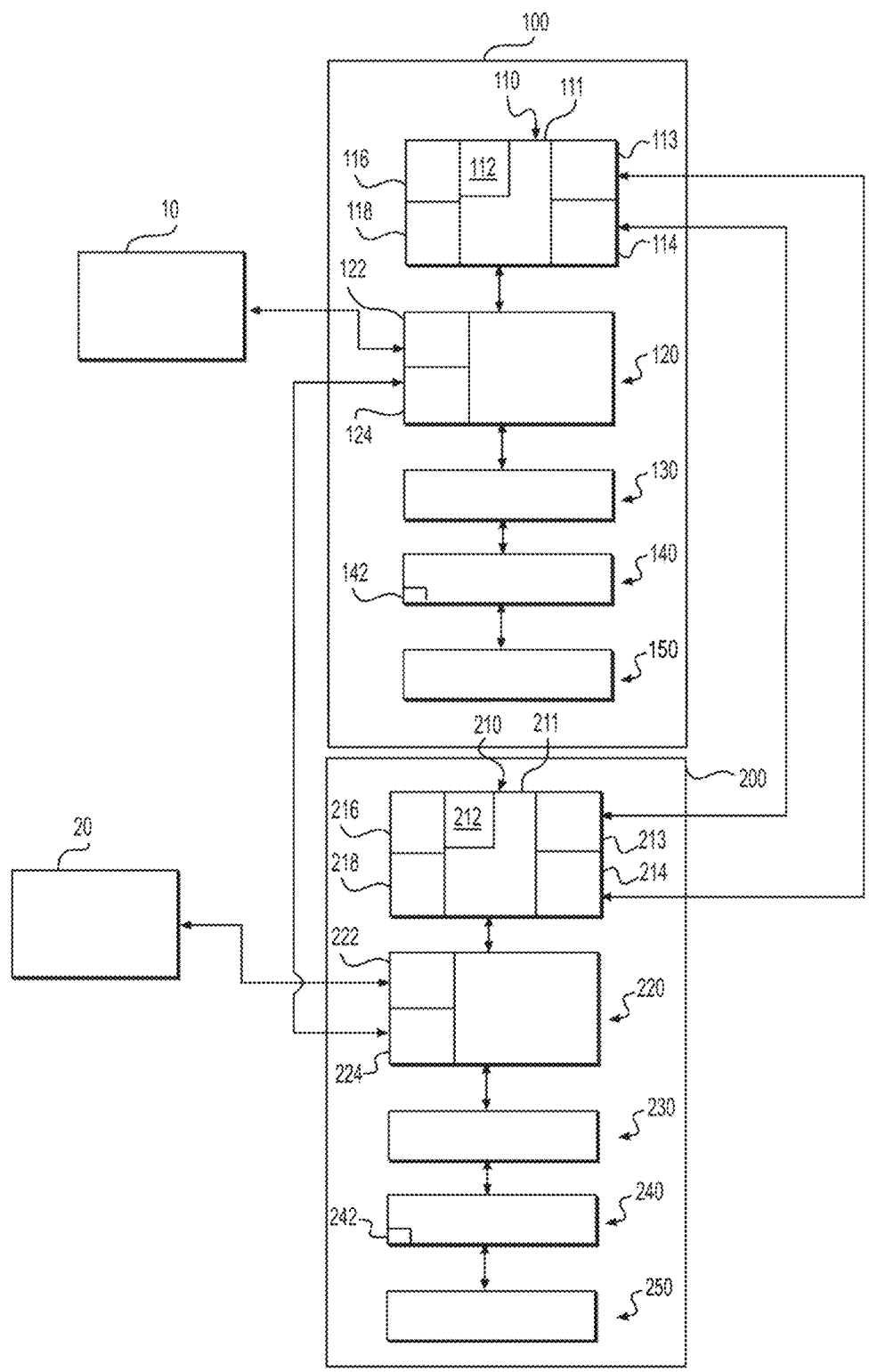
FIG. 1 is a block diagram of the components of one embodiment of the present disclosure.

Reference will now be made in detail to embodiments of the present disclosure, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another. These and/or other aspects become apparent and are more readily appreciated by those of ordinary skill in the art from the following description of embodiments of the present disclosure, taken in conjunction with the accompanying drawings.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The indefinite articles "a" and "an" as used herein mean one or more when applied to any feature in embodiments and implementations of the present disclosure described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Comprising: In the claims, as well as in the specification, all transitional phrases such as "comprising," "including," "carrying," "having," "containing," "involving," "holding," "composed of," and the like are to be understood to be open-ended, i.e., to mean including but not limited to.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Wearable devices can be worn on user's wrist and offer convenient access in very versatile situations and environments. Identification tags including barcode, QR code, or RFID are highly abundant in multiple enterprise environments and require high frequency of interactions to maintain proper documentation and workflow. Conventionally, most handheld scanners require the user to be constantly handling bulky or heavy equipment for a long period of time.

According to one embodiment of the present disclosure, a wearable device is provided. In particular, for exemplary purpose only, the wearable device in the medical field will be described herein in detail. However, of course, the present disclosure is not limited thereto.

The wearable device acting as a handheld scanner can be a useful tool to record and maintain a patient's condition. For instance, whenever a user takes medication, the user can read a barcode label on a medicine container with the wearable device. Thus, a memory coupled to the wearable device can store detailed information of time, location, frequency, and contents therein so that it enables to keep track of the patient's medical record.

Furthermore, the wearable device can provide an alarm for how often the user needs to take one or more doses of a plurality of medications, over a span of hours and days, and the wearable device can keep track of times the dosages are taken. Thus, where a person is required, for reasons of health, to take a variety of medications at differing times of the day or night, then it can be easily performed with the wearable device according to the present disclosure with a simple program.

The wearable device as a handheld scanner is convenient in regards to aiming, handling, and repositioning the barcode scanner light to insure that all angles and ranges are available for the user to scan with ease. The conversion between a wearable device and a handheld one allows the user to carry the scanner hands-free without the need to hold it, as well as have quick access to it in any moment of need.

With reference now to FIG. 1, there is depicted a block diagram of two (2) independent computing devices "10" and "20," and two (2) wearable devices 100 and 200 that are presented for only exemplary and explanatory purposes as similar pairs of a first computing device 10 and a first wearable device 100, and a second computing device 20 and a second wearable device 200. For the purposes of this application, a "computing device" is to be interpreted broadly as including among others standard personal computers, smart phones, notebooks, tablets, "iPod", "iPad", similar Android or iOS devices, and any type of wearable device having user interface. Obviously, more than two independent computing devices can be employed in accordance with the present disclosure.

First and second wearable devices 100 and 200 are now described in greater detail in which the same units digits and tens digits are used to identify the same components in each wearable device 100 or 200. However, only first wearable device 100 is described further herein, but it is understood that second wearable devices 200 have the same type of components that are identified by the same units digits and tens digits.

Referring to FIG. 1, the first wearable device 100 can be comprised of at least one of a wrist band unit 110, a network unit 120, a display assembly 130, a control unit 140, a reader 150. Wrist band unit 110 is designed to be worn on the wrist of a user. Wrist band unit 110 is described in greater detail with respect to FIGS. 2A, 2B, 2C, 2D, 3A, 3B, 3C, and 3D.

Wrist band unit 110 can be made of any flexible material, preferably a polymer plastic, but could also include a standard plastic, leather, and a shaped metal band or linked metal band. In some embodiments, wrist band unit 110 can have a length adjustable feature. For example, each ends of wrist band unit 110 can include a conventional detachable metal/plastic block (not shown) or a conventional magnetic block (not shown) to adjust the length.

Network unit 120 is configured to communicate with other devices. Network unit 120 can be, for instance, disposed at display assembly 130. Display assembly 130 can include control unit 140 as well. Display assembly 130 can include at least one reader 150. Reader 150 is configured to scan either barcode, QR, or a Radio Frequency Identification ("RFID"). Reader 150 will be described later in detail.

Network unit 120 can be disposed at display assembly 130. Operationally, network unit 120 is comprised of at least one of a wireless and/or Bluetooth communications transceiver unit 122, a NFC (Near Field Communication) unit 124, an internet connection unit (not shown), or a Global Positioning System (GPS) unit (not shown). In general, network unit 120 is a communication unit that can wirelessly communicate with first computing device 10. For instance, network unit 120 can communicate with the first computing device 10 using a Bluetooth or internet connection unit (not shown) including Long-Term Evolution (LTE) or Wifi. Network unit 120 can also communicate with another wrist band unit 210 within a second wearable device unit 200, for instance, by using an NFC device.

For conventional practical reasons, network unit 120 can utilize high frequency electromagnetic radiation, but it is also possible to use, for example, a line-of-sight mechanism such as infrared signals (as used in many television remotes), or to use sonar or lower frequency radiation. In addition, in an alternative embodiment, a communications unit can include a unit for wirelessly accessing the Internet, or other communication network, and/or to a satellite.

Display assembly 130 can be mounted on wrist band unit 110. Display assembly 130 can include a conventional LCD or LED display, and can include a touchpad or panel. Control unit 140 includes a processor 142 programmed and connected to deliver commands and receive information from display assembly 130, and network unit 120.

Reader 150 is coupled to control unit 140. Reader 150 is configured to read at least one of a barcode, a QR code, or RFID.

Reader 150 can be a barcode reader. A barcode is an optical machine-readable representation of data relating to the object to which it is attached. Barcodes systematically represent data by varying the widths and spacings of parallel lines, and may be referred to as linear or one-dimensional (1D). Later two-dimensional (2D) codes were developed, using rectangles, dots, hexagons and other geometric patterns in two dimensions, usually called barcodes although they do not use bars as such Barcodes can be scanned by reader 150, optical scanners.

Reader 150 can be a QR code reader. QR code (abbreviated from Quick Response Code) is the trademark for a type of matrix barcode (or two-dimensional barcode). A barcode is a machine-readable optical label that contains information about the item to which it is attached. A QR code can, for instance, use four standardized encoding modes (numeric, alphanumeric, byte/binary, and kanji) to efficiently store data.

Reader 150 can be a Radio Frequency Identification (RFID) reader having an antenna, and an image capture device coupled to at least one of the readers and the antennae. Radio Frequency Identification (RFID) systems are of use in many different areas. For example, RFID systems can be used to track goods as they move throughout the supply chain. A RFID system includes reader 150, at least one RFID tag affixed to an item of interest and, a computer system coupled to reader 150 to process data. RFID tags include memory that stores data concerning the item to which the RFID tag is attached. For example, an RFID tag may be attached to a product or a product's packaging such as the packaging for a drill. The RFID tag attached to the drill's packaging can store a product identification code that uniquely identifies the item. Reader 150 sends interrogation signals to RFID tags and receives responses from the RFID tag. Reader 150 can be handheld. Reader 150, depending on the needs of the end user and the capability of the RFID tags, can read data from the RFID tag and/or write information to the RFID tag. In the example discussed above, reader 150 can be used to read the product identification code from the RFID tag attached to the packaging of the drill. The computing device receives data from reader 150 and can then store, process or otherwise use the collected data. In the example discussed previously, the computer system can receive the product identification code from reader 150 and then use the product identification code in conjunction with a database program to retrieve pricing information for the drill. The pricing information can be sent back to a device that is part of the computer system. For example, the pricing information may be sent to a point-of-sale (POS) system. While typical RFID systems, with handheld or a fixed reader 150, are ideal in many circumstances, but they have drawbacks. For example reader 150 can be cumbersome to use. Also, RFID systems require a user to point the reader 150 at different tags. The repetitive nature of pointing and activating reader 150 can be tiring to individual users. Regarding RFID, the U.S. non-Provisional application Ser. No. 10/931,462, filed 31 Aug. 2004, is incorporated by reference herein in its entirety.

Figure 2A:
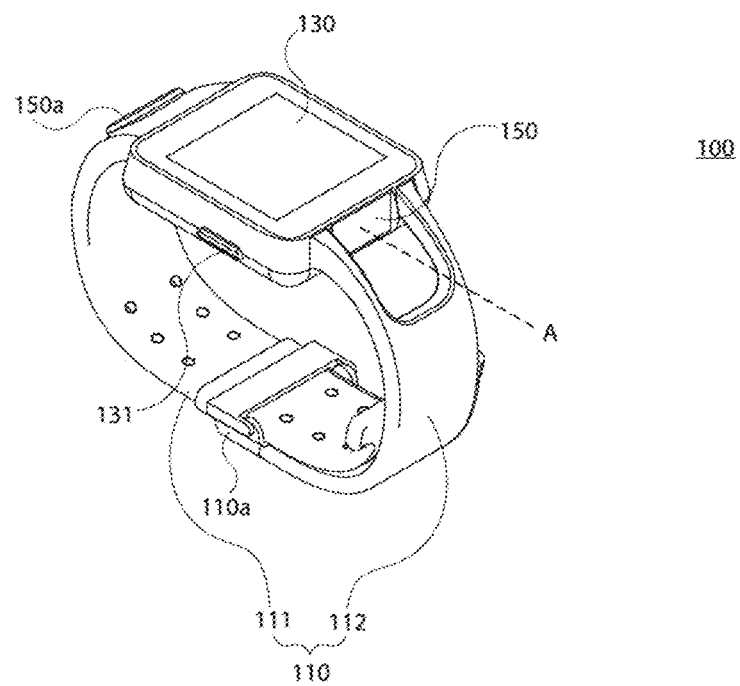
FIG. 2A is a perspective view of the wearable device in a first mode according to one embodiment of the present disclosure.
Figure 2B:
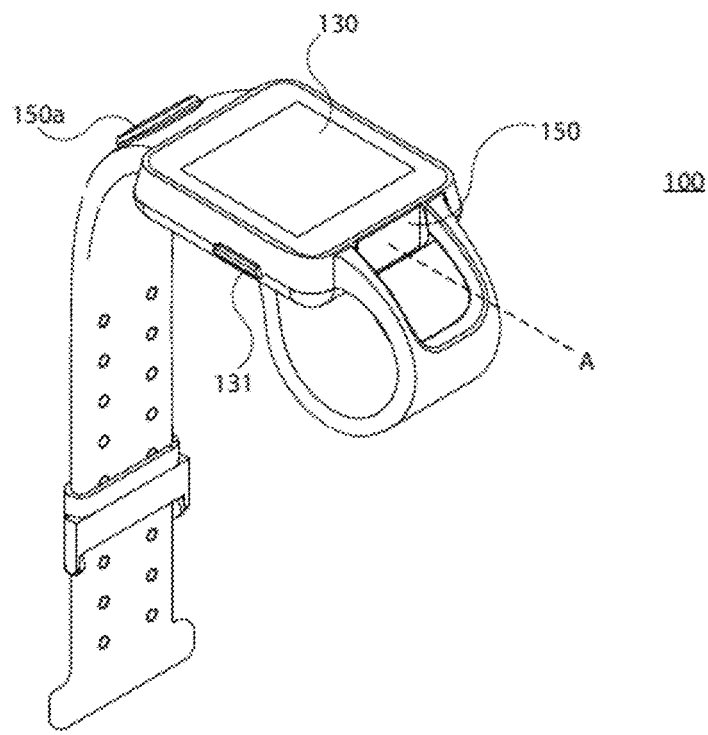
FIG. 2B is a perspective view of the wearable device in a second mode according to one embodiment of the present disclosure.

With reference to FIGS. 2A and 2B, first wearable device 100 is depicted in greater detail in a presently preferred embodiment. FIG. 2A is a perspective view of the wearable device 100 in a first mode according to one embodiment of the present disclosure. FIG. 2B is a perspective view of the wearable device 100 in a second mode according to one embodiment of the present disclosure.

A wearable device 100 includes wrist band unit 110 and display assembly 130 having a reader 150.

Wrist band unit 110 has a length adjustable feature 110a. Wrist band unit 110 can be fully closed and have certain rigid areas therein which can be adjusted for a length to accommodate a handle. Wrist band unit 110 has a plurality of hinges which allow flexibility to wrist band unit 110 in response to the differing shapes of individual wrists.

Wrist band unit 110 can be a standard strap. Wrist band unit 110 has a first wrist band unit 111 and a second wrist band unit 112. Referring to FIG. 2B, at least one of first wrist band unit 111 and second wrist band unit 112 can be folded. More variations thereof will be described with reference to FIGS. 3A-3D.

The display assembly 130 can be detachably attached to the wrist band unit 110. At least one display button 131 is attached to display assembly 130 and can be used for predetermined purposes. Display button 131 can be found on a side of the display assembly 130.

Display assembly 130 can include reader 150. Reader 150 can be integrated to display assembly 130. In another embodiment, reader 150 can detachably attached to display assembly 130. In another embodiment, reader 150 can detachably attached to wrist band unit 110. For exemplary purposes, although only one single reader 150 is described in FIG. 2A, a number of the reader 150 is not limited thereto. For exemplary purposes only, reader 150 can be positioned to face along a tangential direction A to a curve made by wrist band unit 110. The tangential direction A is described in FIGS. 2A and 2B with dotted lines. However, the location of reader 150 on display assembly 130 is not limited thereto. Reader button 150a is electrically coupled to reader 150. Thus, when the user pushes reader button 150a, reader 150 works a predetermined task. For exemplary purposes only, reader button 150a is described as located at first wrist band unit 110, the location thereof is not limited thereto. For instance, reader button 150a can be located on display assembly 150, second wrist band unit 110, or inside wrist band unit 110. Wrist band unit 110 can have a wrist band opening 110b corresponding to reader 150 so that it is ensured that reader 150 has a line of sight to an object.

Figure 2C:
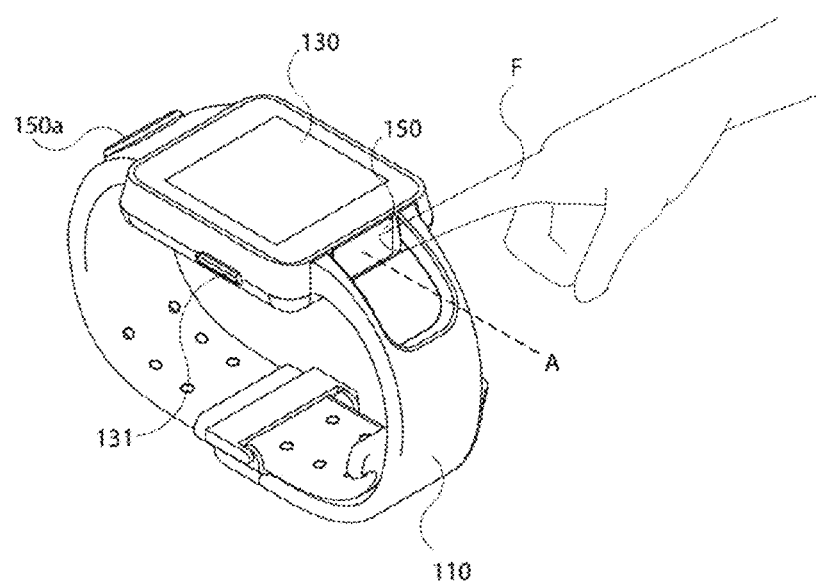
FIG. 2C illustrates a usage of the wearable device of FIG. 2A.
Figure 2D:
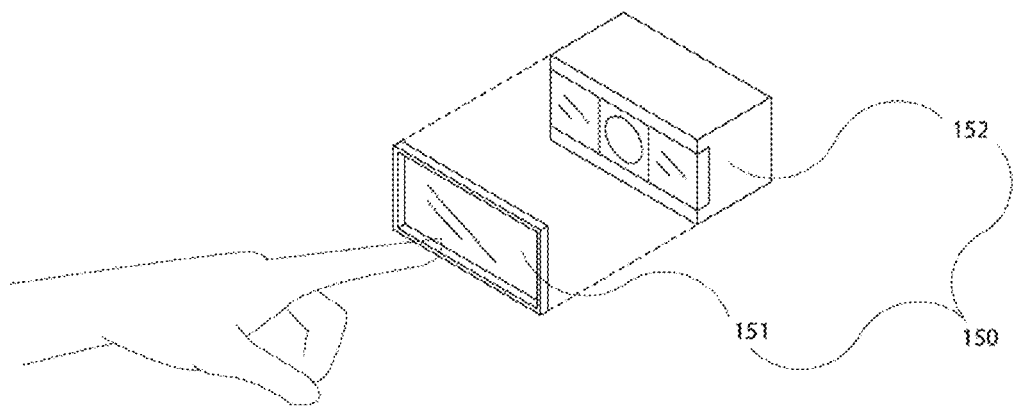
FIG. 2D illustrates a disassembled perspective view of a scanner disposed in the wearable device of FIG. 2A.

Referring to FIG. 2C, reader 150 can be activated by a user's finger F with a transparent touch digitizer in front of reader 150. Referring to FIG. 2D, reader 150 can include a touch digitizer 151 and reader device 152. Reader device 152, for instance, can be a scanner. Touch digitizer 151 can activate reader 150 by the user's tapping, long press, or swiping.

Reader 150 standing alone or attached to display assembly 150 can be used independently as a handheld scanner. Reader 150 can be a scanner so that wearable device 100 can be converted to a handheld scanner. Since wrist band unit 110 can act as a holder for the detachable display assembly having the scanner, the wrist band unit 110 can be set back at different angles to change a scan angle.

Figure 3A:
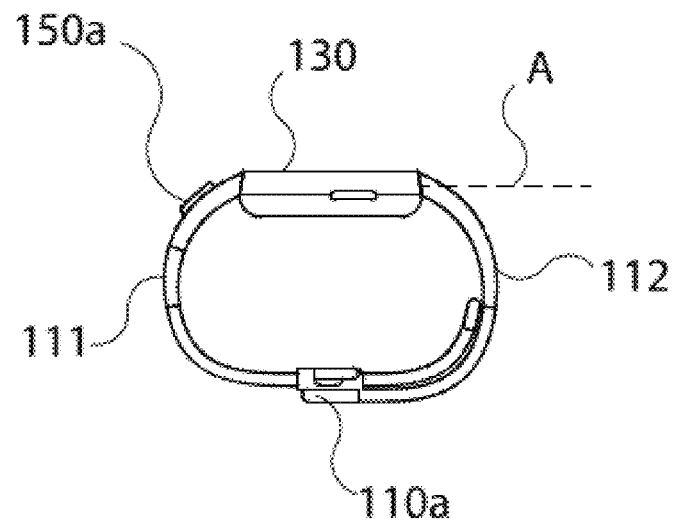
FIGS. 3A-3D illustrate side views of the wearable device in various configurations according to another embodiment of the present disclosure.
Figure 3B:
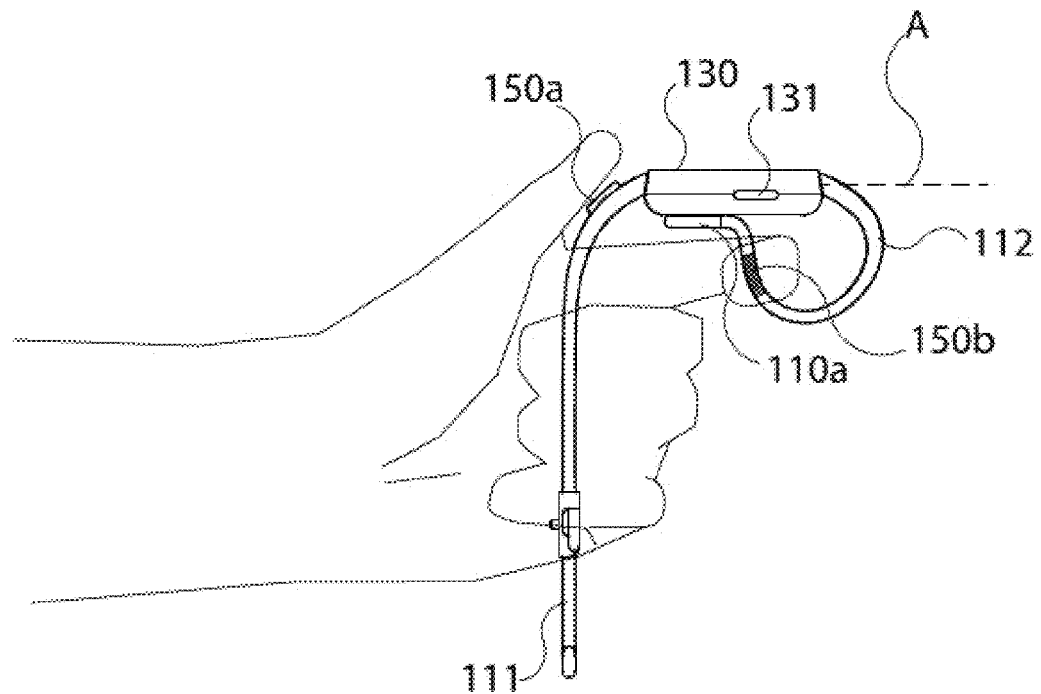

FIGS. 3A-3D illustrate various embodiments of combinations of first wrist band unit 111 and second wrist band unit 112. Referring to FIG. 3A, first wrist band unit 111 and second wrist band unit 112 are connected to each other and form a circular shape. Referring to FIG. 3B, second wrist band unit 112 is connected to display assembly 130 forming a trigger guard. Second wrist band unit 112 can have length adjustable feature 110a which is comprised of a magnetic material and is magnetically connectable to the bottom plate of display assembly 130. The connection between display assembly 130 and length adjustable feature 110a form a loop where a user can insert a finger for stability and to ensure that the user does not lose grip and drop the device. The material of wrist band unit 110 can has a fraction surface for better grip.

Figure 3C:
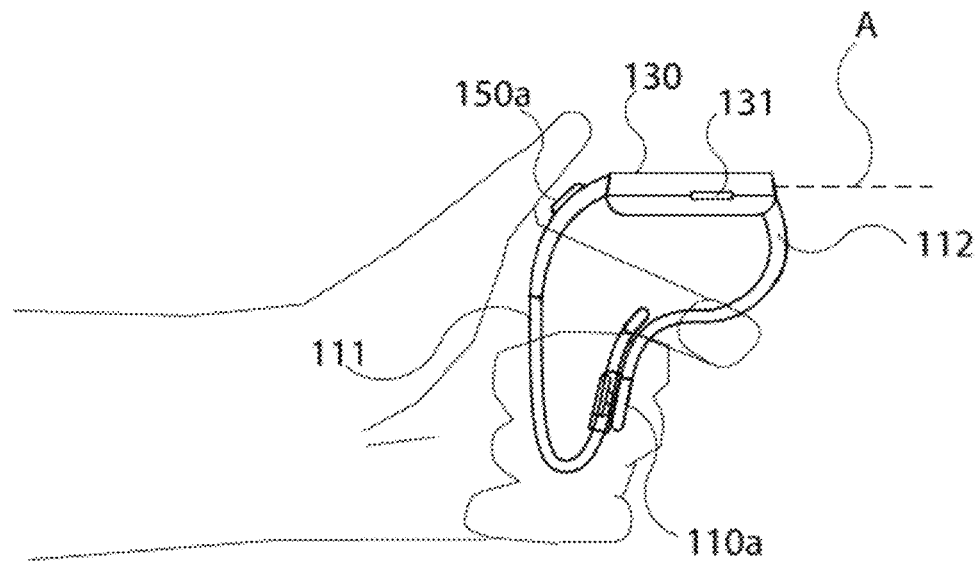
Figure 3D:
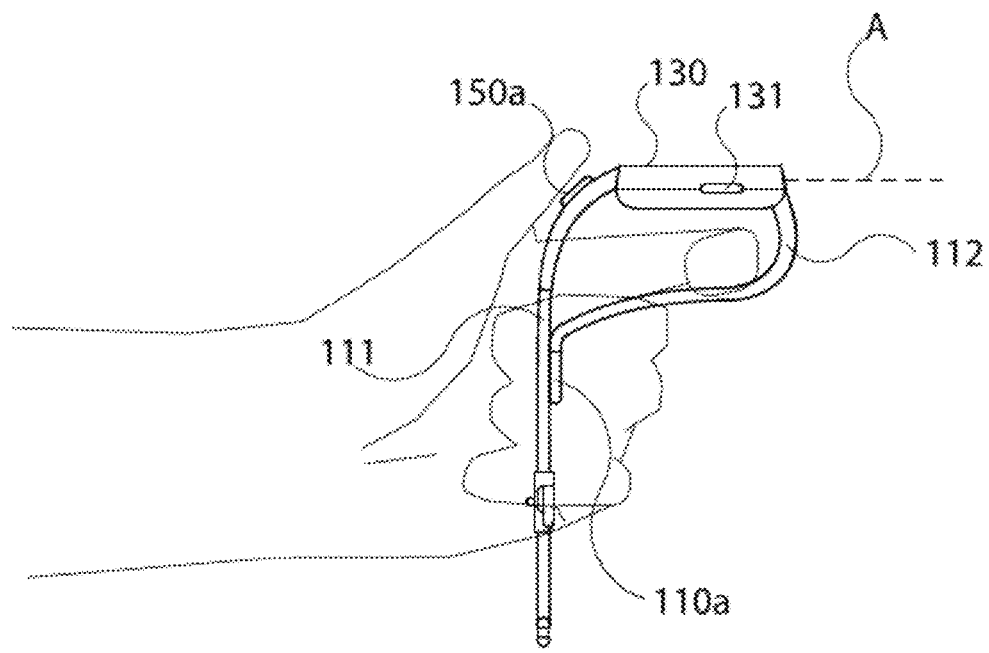

Thus, wrist band unit 110 is converted in a gun trigger shape. A user can use reader button 150a on first wrist band unit 111. In another embodiment, reader button 150a can be located in second wrist band unit 112 to which a reference number 150b indicates corresponding to an index finger. Referring FIG. 3C, first wrist band unit 111 and second wrist band unit 112 are connected one another so that second wrist band unit 112 forms concave and convex curvatures as shown in FIG. 3C so that a user can easily grip wrist band unit 110. Referring to FIG. 3D, second wrist band unit 112 is connected to a middle of first wrist band unit 111.

Figure 4:
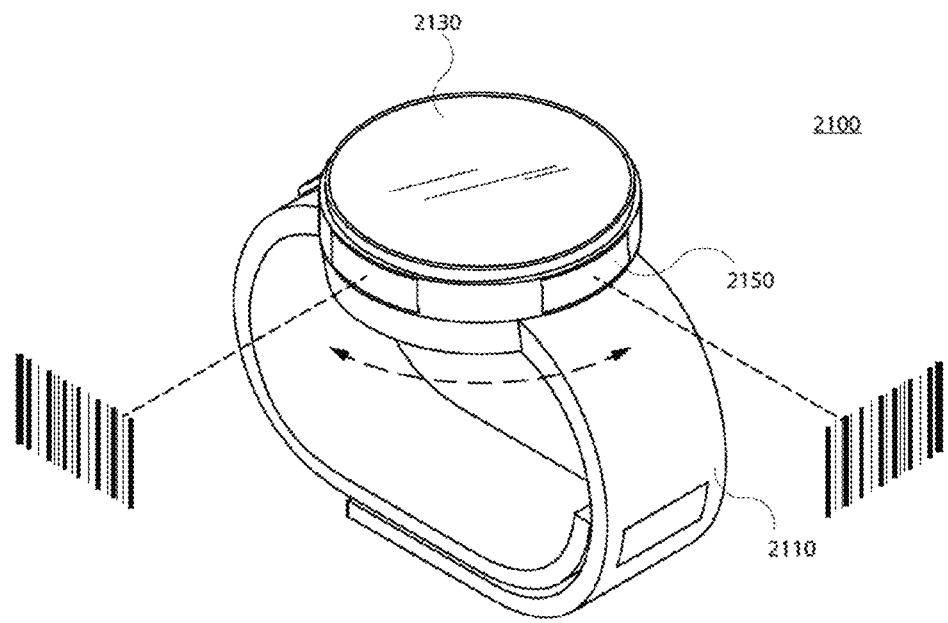
FIG. 4 is a perspective view of the wearable device with a rotatable display assembly according to another embodiment of the present disclosure.

FIG. 4 is a perspective view of wearable device 2100 with a rotatable display assembly according to another embodiment of the present disclosure. Wearable device 2100 includes a wrist band unit 2110, a display assembly 2130, and a reader 2150. Display assembly 2130 can be rotatably attached to wrist band unit 2110. A user can rotate display assembly 2130 to aim at a target barcode. As display assembly 2130 rotates with respect to wrist band unit 2110, reader 2150 attached to display assembly 2130 can rotate so as to change a scan angle. Display assembly 2130 is preferably centrally located on a central section of wrist band unit 2110. The user can rotate display assembly 2130, for instance, 90 degrees. Of course, a rotation degree of display assembly 2130 is not limited thereto. The user can rotate display assembly 360 degree.

Figure 5:
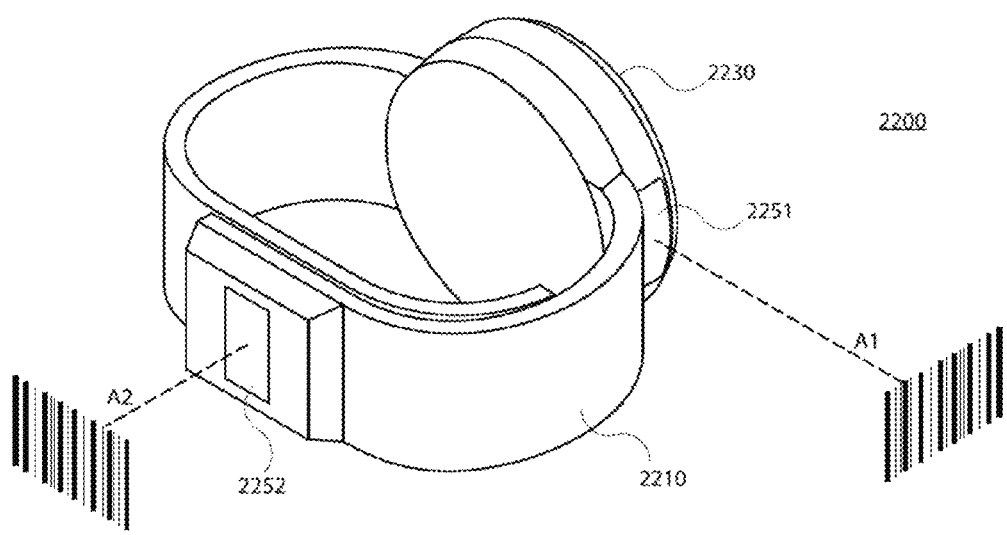
FIG. 5 is a perspective view of the wearable device having a plurality of readers according to another embodiment of the present disclosure.

FIG. 5 is a perspective view of wearable device 2200 having a plurality of readers 2251 and 2252 according to another embodiment of the present disclosure. Wearable device 2200 has a wrist band unit 2210, a display assembly 2230, and a plurality of readers 2251 and 2252. The plurality of readers 2251 and 2252 includes a first reader 2251 and a second reader 2252. Although only two readers, first and second readers 2251 and 2252, are presented here, a number and position of the plurality of readers 2251 and 2252 are not limited thereto. First reader is disposed at display assembly 2230. Second reader is disposed at wrist band unit 2210. The plurality of readers 2251 and 2252 increase chances to scan barcode around the user's wrist. The plurality of readers 2251 and 2252 can even scan a plurality of barcode at the same time.

Figure 6A:
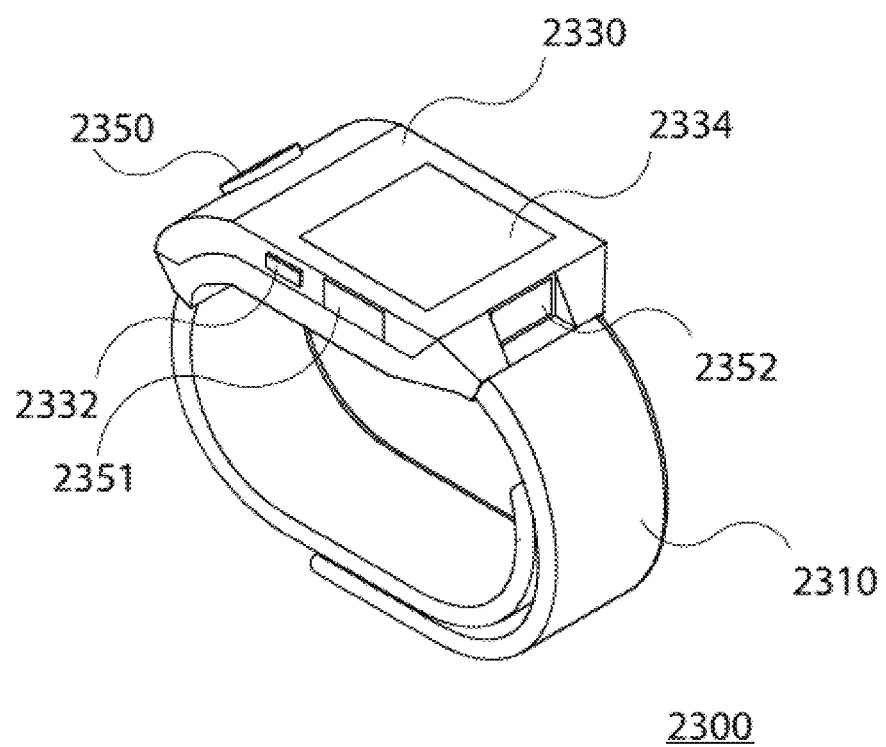
FIGS. 6A and 6B illustrate perspective views of the wearable device with a detachable display assembly according to another embodiment.
Figure 6B:
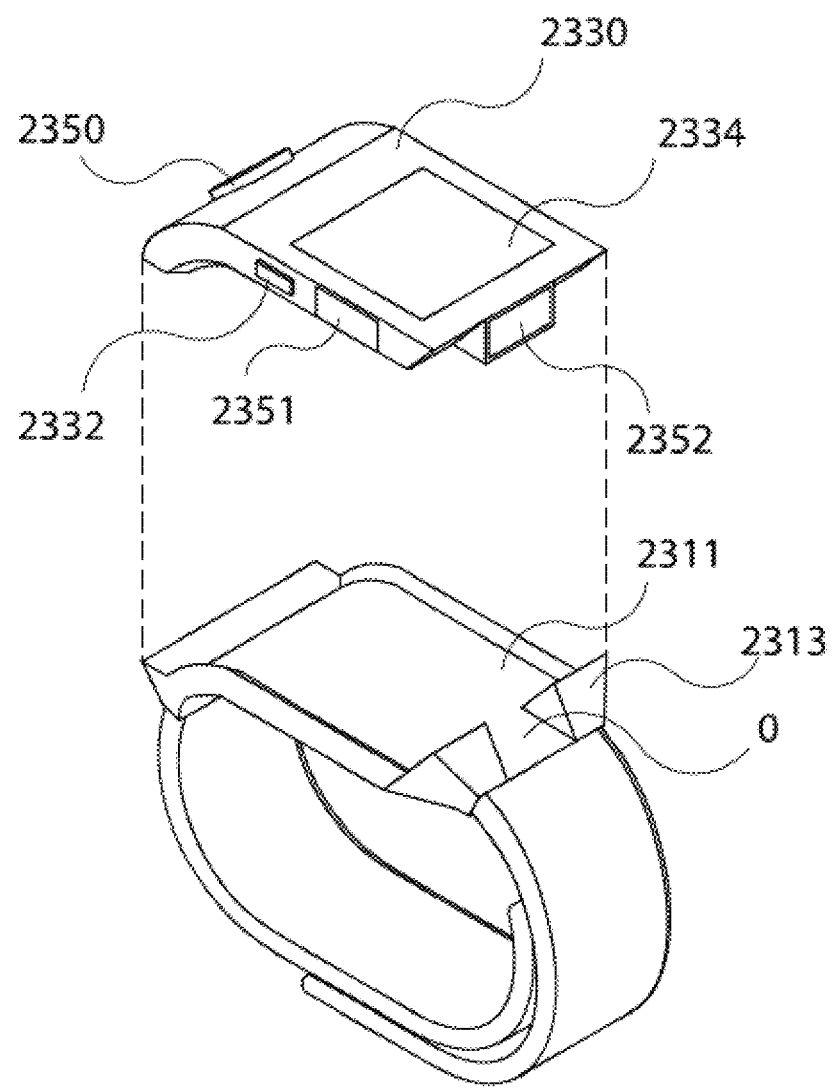

FIGS. 6A and 6B illustrate perspective views of wearable device 2300 with a detachable display assembly 2330 according to another embodiment. Wearable device 2300 includes a wrist band unit 2310, a display assembly 2330, and a plurality of readers 2351 and 2352.

Display assembly 2330 is detachably attached to wrist band unit 2310. Display assembly 2330 includes a display button 2332, a display panel 2334, a first reader 2351, a second reader 2352, a reader button 2350. Display button 2332 provides a predetermined function that a user can interact with display assembly 2330. Display panel 2334 can be any conventionally available display device. Display panel 2334 can include any type of touch-screen. First reader 2351 and second reader 2352 can be positioned at display assembly 2330. A number and position of first reader 2351 and second reader 2352 are not limited thereto.

Wrist band unit 2310 can include a display base 2311 and a reader protrusion 2313. Display base 2311 is configured to accommodate display assembly 2330. Reader protrusion 2313 is protruded from display base 2311 so that reader protrusion 2313 secures display assembly 2330 therein and at the same time forms an opening O. Opening O is formed corresponding to second reader 2352 so that a line of sight of second reader 2352 is not blocked.

Figure 7A:
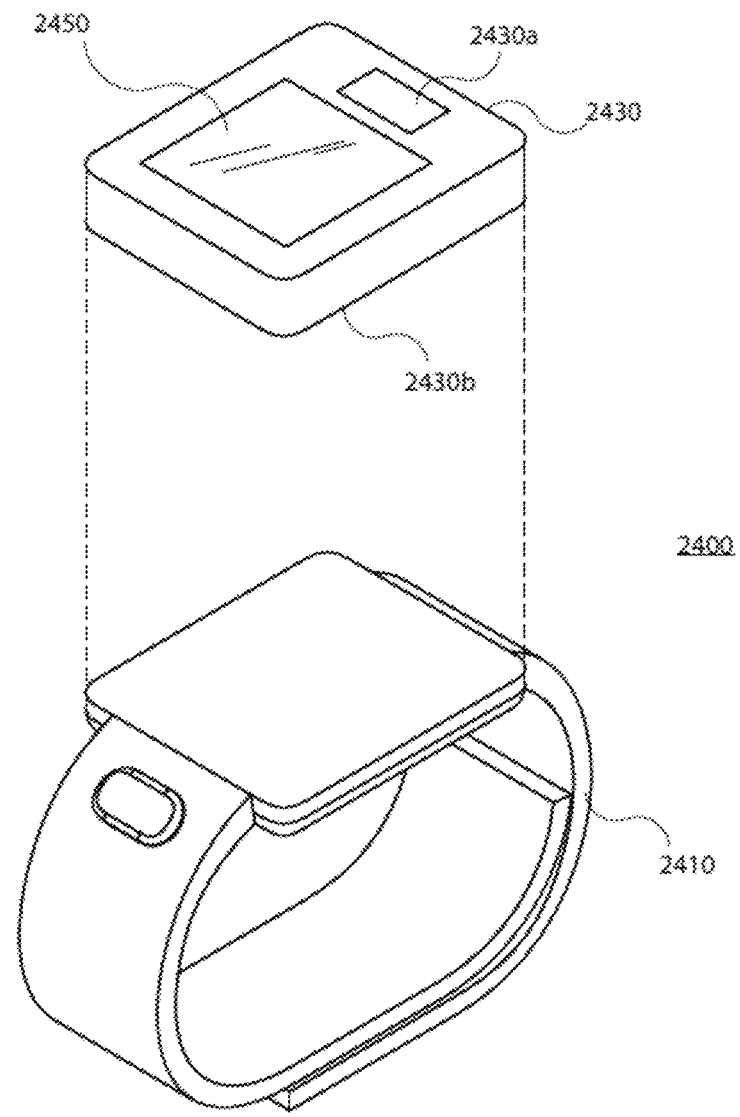
FIGS. 7A-7C illustrate perspective views of the wearable device with a detachable display assembly according to another embodiment.
Figure 7B:
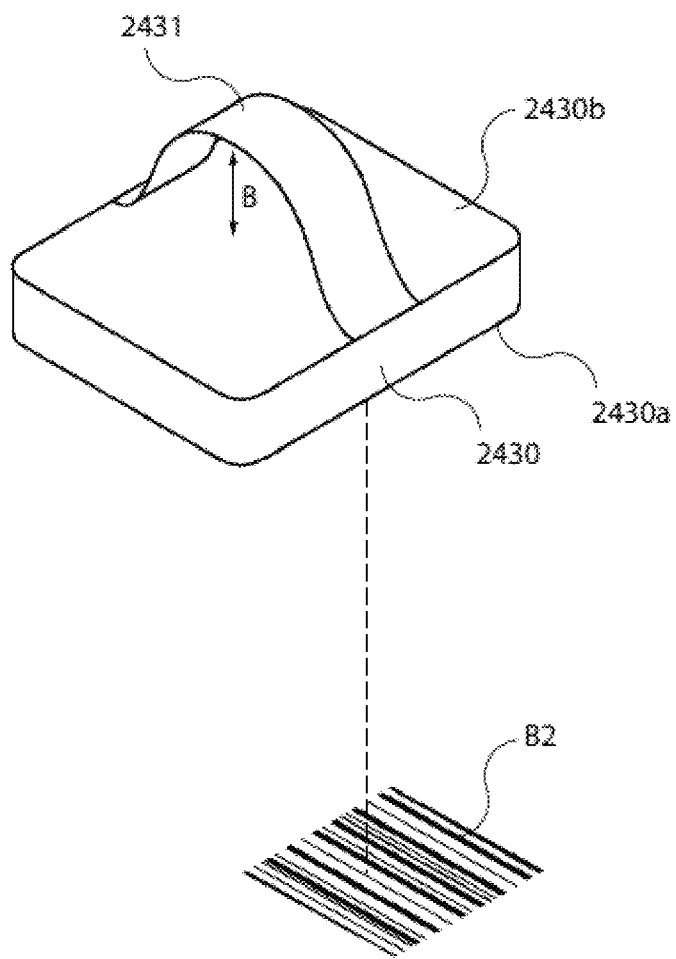
Figure 7C:
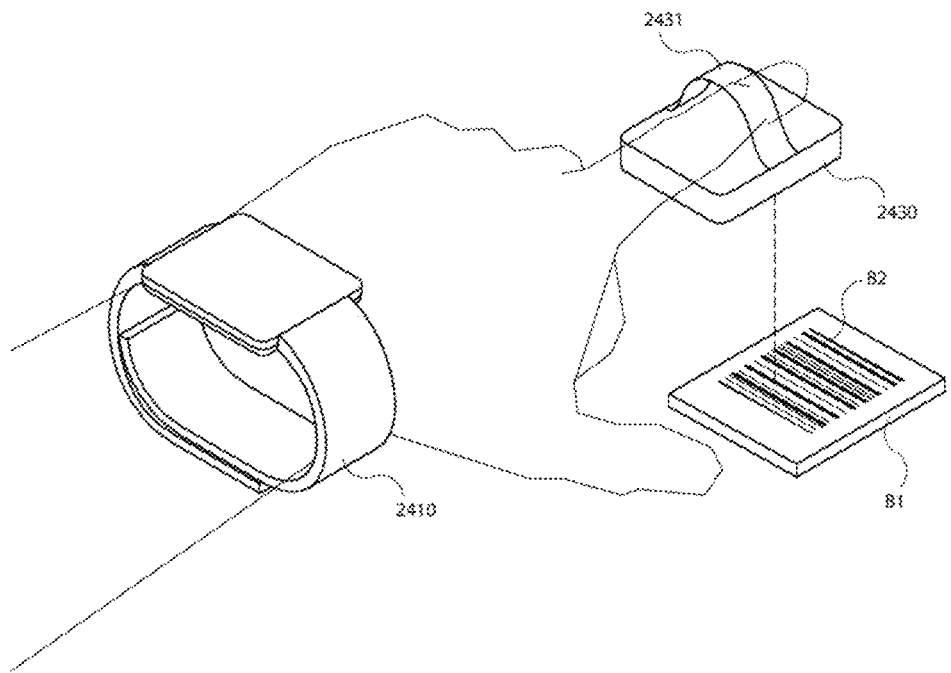

FIGS. 7A-7C illustrate perspective views of wearable device 2400 with a detachable display assembly 2430 according to another embodiment. Wearable device 2400 includes a wrist band unit 2410 and a display assembly 2430 which has a reader 2450 therein. Display assembly 2430 is detachably attached to wrist band unit 2410. Display assembly 2430 has a first surface 2430*a* and a second surface 2430*b*. First surface 2430*a*, for instance, has reader 2450. Referring to FIG. 7B, second surface 2430*b* can have a holder 2431. For instance, holder 2431 is a elastic band which extends along a direction of an arrow B in FIG. 7B. Referring to FIG. 7C, a user can wear display assembly 2430 on finger with holder 2431 while wearing wrist band unit 2410 around the user's wrist. When an object B1 has a barcode B2 on it, it is easiler for the user to scan with display assembly 2430 by moving their hands and using their fingers. Although not illustrated, wrist band unit 2410 can have an additional reader (not shown) thereon and thus it can enhance the chances to scan barcodes.

Figure 8:
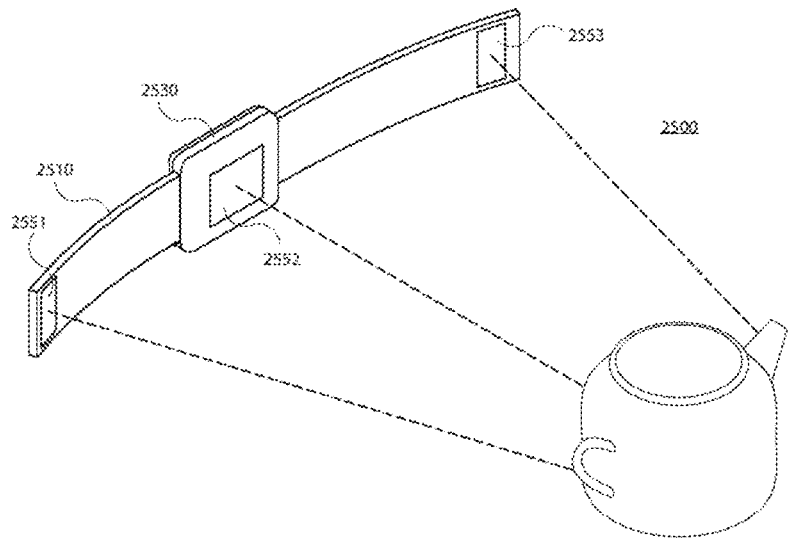
FIG. 8 illustrates perspective views of the wearable device for three (3) dimension scanning according to another embodiment.

FIG. 8 illustrates perspective views of wearable device 2500 for three (3) dimension scanning according to another embodiment. Wearable device 2500 includes a wrist band unit 2510, a display assembly 2530, and a plurality of readers 2551, 2552, and 2553 therein.

Each of the plurality of readers 2551, 2552, and 2553 is separately disposed at a predetermined distance from one another. For three-dimensional scanning, it requires at least one reader and at least one display assembly 2530; wrist band unit 2510 can accommodate any one of the at least one reader. A 3D scanner is a device that analyses a real-world object or environment to collect data on its shape and possibly its appearance (e.g. colour). The collected data can then be used to construct digital three-dimensional models. Collected 3D data is useful for a wide variety of applications. These devices can be used extensively by the entertainment industry in the production of movies and video games. Other common applications of this technology include but are not limited to industrial design, orthotics and prosthetics, reverse engineering and prototyping, quality control/inspection and documentation of cultural artifacts.

Figure 9:
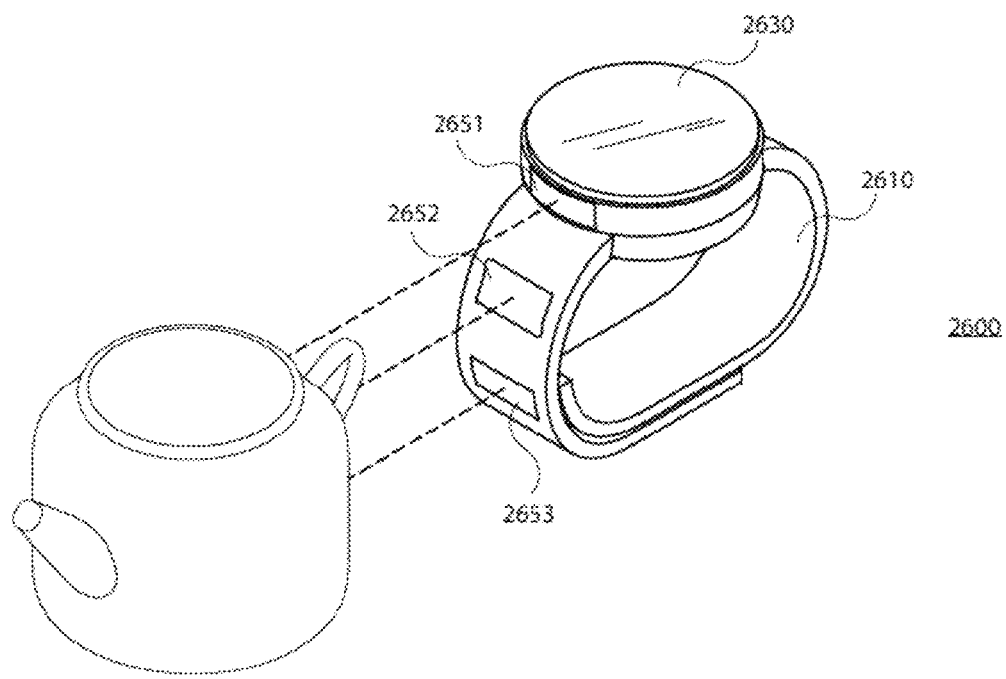
FIG. 9 illustrates perspective views of the wearable device for three (3) Dimension scanning according to another embodiment.

FIG. 9 illustrates perspective views of wearable device 2600 for three (3) Dimension scanning according to another embodiment. Wearable device 2600 includes a wrist band unit 2610, a display assembly 2630, and a plurality of readers 2651, 2652, and 2653 therein. FIG. 9 is another variation of the embodiment illustrated in FIG. 8 with different positions of the plurality of readers 2651, 2652, and 2653.

Now, with reference to FIGS. 10A to 14D, examples of wearable device in use are provided.

Figure 10A:
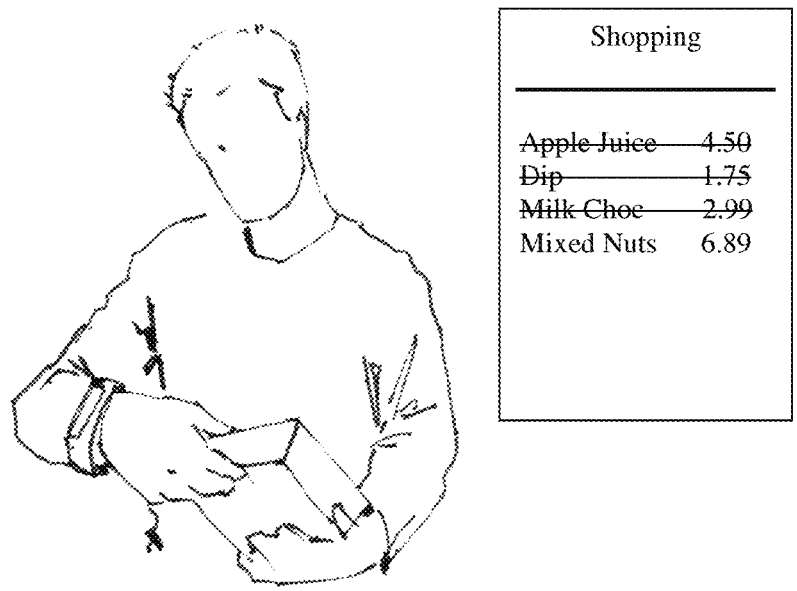
FIGS. 10A-10C illustrate a barcode scanning with a wearable device in use at a shopping store according to another embodiment of the present disclosure.
Figure 10B:
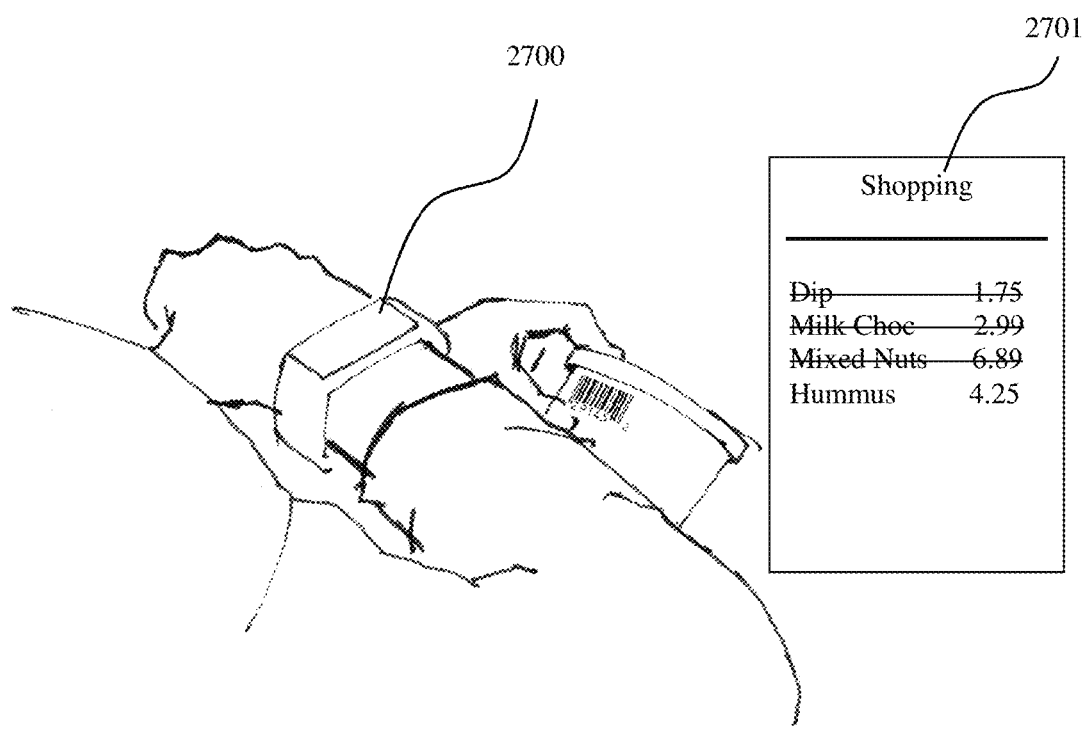
Figure 10C:
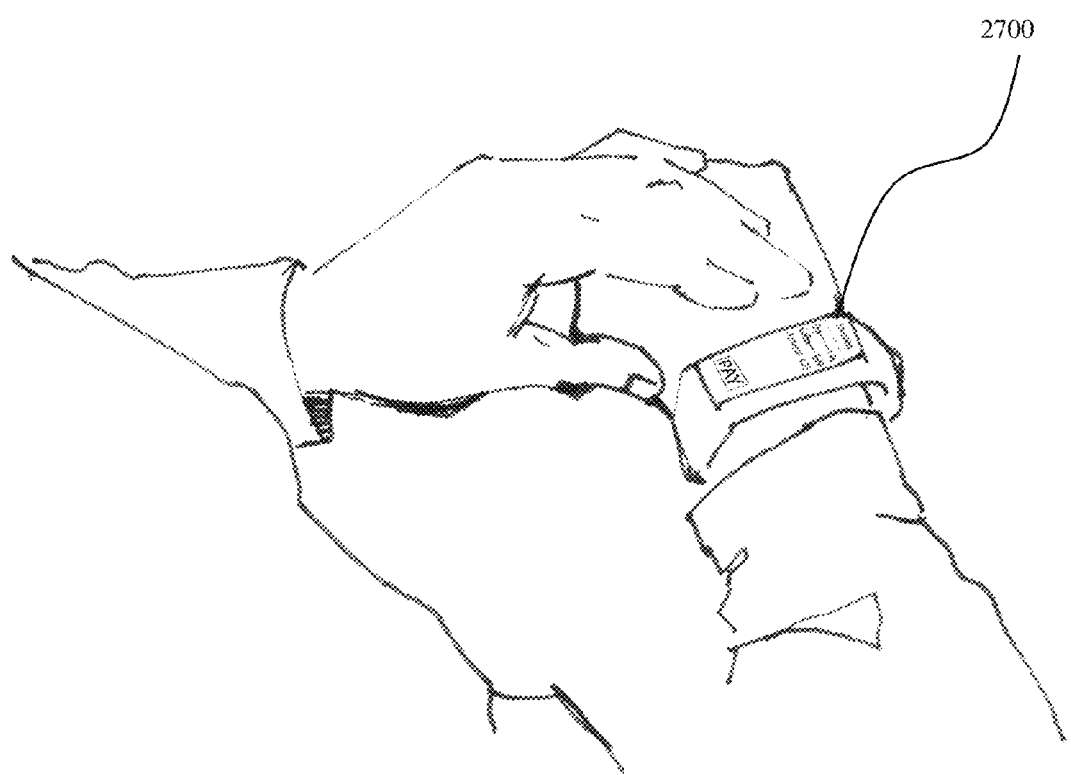

FIGS. 10A-10C illustrate a barcode scanning with a wearable device 2700 according to another embodiment of present disclosure at a shopping store. Here, 2700 wearable device can include a barcode reader (not shown) and a payment unit (not shown).

As depicted in FIG. 10B, wearable device 2700 can be configured to display a shopping list on a display assembly. Although not illustrated, the shopping list can be updated by different authorized users in real time. A shopping list can be prepared by a smart phone or a computer, and the smart phone or the computer can transmit the shopping list to wearable device 2700. While the user scans the targeted item's barcode with the reader, the shopping list displays the scanned item in a strikethrough format 2701. While shopping, wearable device 2700 can obtain price information through the barcode scanning and communicate with a payment server, e.g., bank server or credit card company for the payments. Thus, the user can pay for the purchased items on the spot through the barcode scanning and finger touch on the display assembly. Thus, wearable device 2700 can function as a point of sale. The wearable device can communicate with the seller's server via an Internet network, a Near Field Communication (NFC), or a Bluetooth. Thus, if the user is in a particular grocery store, wearable device 2700 can be connected to the grocery store's server or interface, and pay for the purchased items. The grocery store can provide the user with a receipt before the user exits. Wearable device 2700 can be configured to communicate with a receipt generator and print out a receipt of the purchased items. Upon a request of an employee of the grocery store at the exit/entry gate, the user can show the printed receipt to verify that the user paid for the purchased items. Wearable device 2700 can be used as a handheld scanner by retailers so that the retailers can scan multiple items and review total amount for purchase without referring to a desk and reducing bulk of similar devices. NFC (Near Field Communication) function at wearable device 2700 can interact with grocery store's server or bank server to receive payment information via network.

Regarding the systems, methods and program products for automatically generating authenticated electronic receipts at a point-of-sale terminal for customers, U.S. non-Provisional application Ser. No. 10/430,824, filed 6 May 2003, is incorporated by reference herein in its entirety.

The wearable device may be provided with near field communication ("NFC") components for enabling contactless proximity-based communications with another entity. These communications can be associated with currency transactions or other secure data transactions that users rely on every day, such as credit card payments and public transportation ticketing.

Wearable device 2700 may include an authentication device capable of performing authentication based upon a finger biometric template, and an electronic device. The wearable device includes a wireless transceiver, a finger biometric sensor, and a processor cooperating with the finger biometric sensor and capable of performing authentication. The processor may also be capable of cooperating with the authentication device to authenticate the finger biometric data according to the finger biometric template. Regarding the authentication method and apparatus, the U.S. non-Provisional application Ser. No. 13/938,400, filed 10 Jul. 2013, is incorporated by reference herein in its entirety.

Bitcoins are a form of internet currency. Bitcoins are intangible virtual coins in the form of a file that may be stored on a computer or a computer-related device. Specifically, a Bitcoin ("BTC") is a unit of currency of a peer-to-peer system that is not regulated by any central or governmental authority. Rather, the regulation of Bitcoins (i.e., the issuance of new Bitcoins and the tracking of transactions involving Bitcoins) may be accomplished collectively by the network of people and businesses that conduct business with Bitcoins. The wearable device is configured to use the Bitcoins for currency. The user of the wearable device can pay for the purchased items with the Bitcoins and receive money from a third party with a Bitcoin.

Current virtual currency transactions (including Bitcoin transactions) as stated above are conducted through networks, mostly through the Internet. For example, U.S. Pat. No. 8,255,297 by Morgenstern et al. discloses a virtual currency system that keeps track of virtual credits, which can be owned, transferred, purchased, and sold by participants in a virtual economy. Regarding the use of the virtual currency, the U.S. non-Provisional application Ser. No. 14/263,850, filed 28 Apr. 2014, is incorporated by reference herein in its entirety and the U.S. non-Provisional application Ser. No. 13/829,421, filed 14 Mar. 2013, is incorporated by reference herein in its entirety.

Figure 11A:
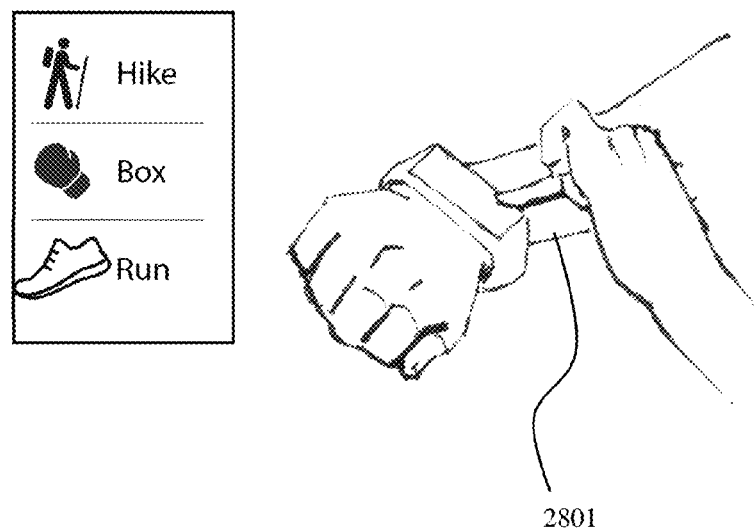
FIGS. 11A-11G illustrate a wearable device in use for sports according to another embodiment of present disclosure.
Figure 11B:
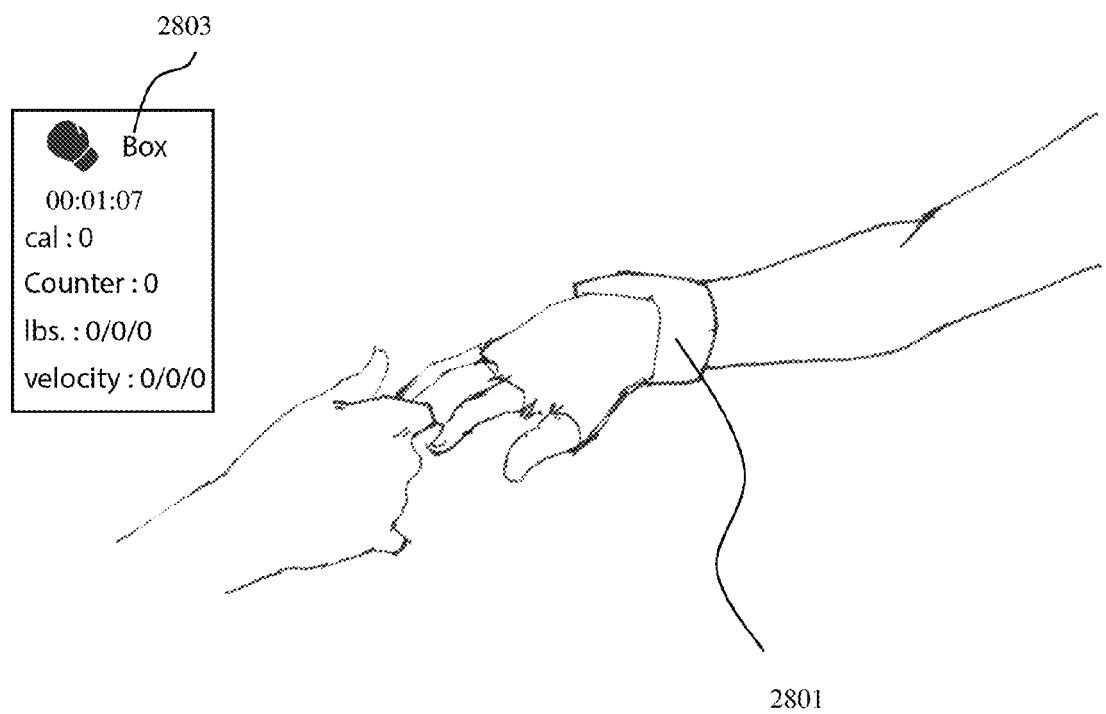
Figure 11C:
Figure 11D:
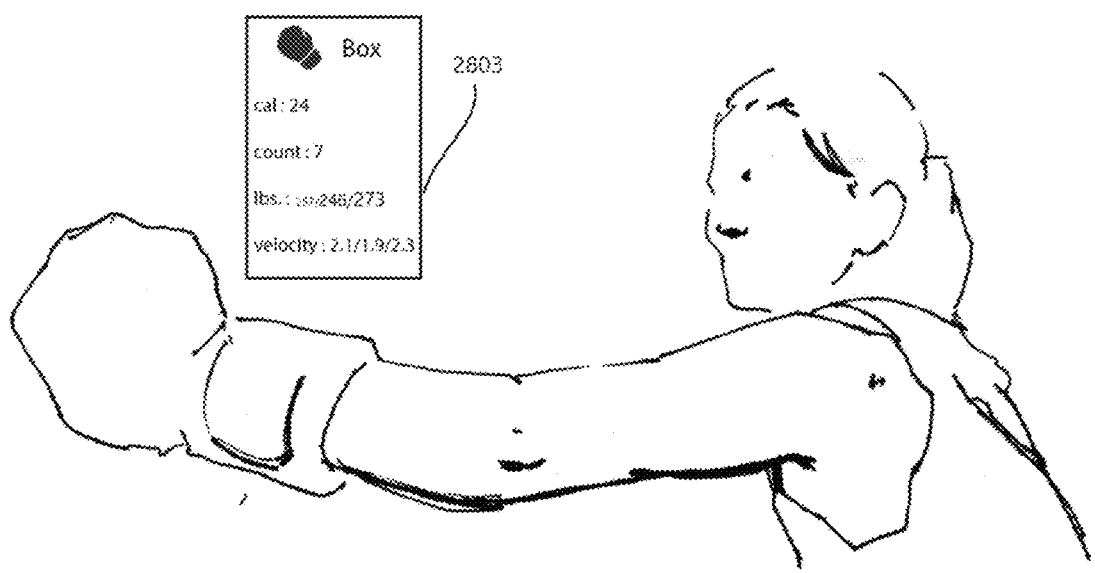
Figure 11E:
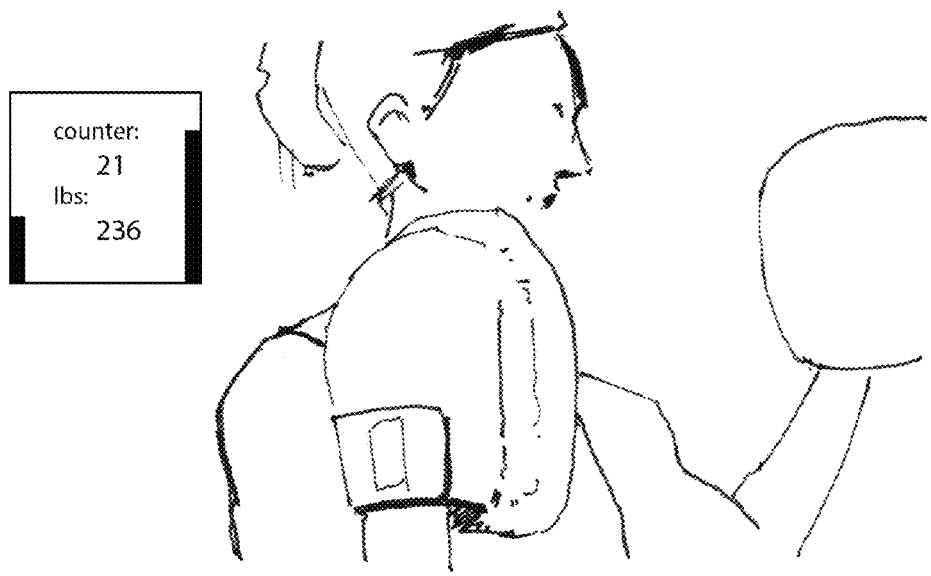
Figure 11F:
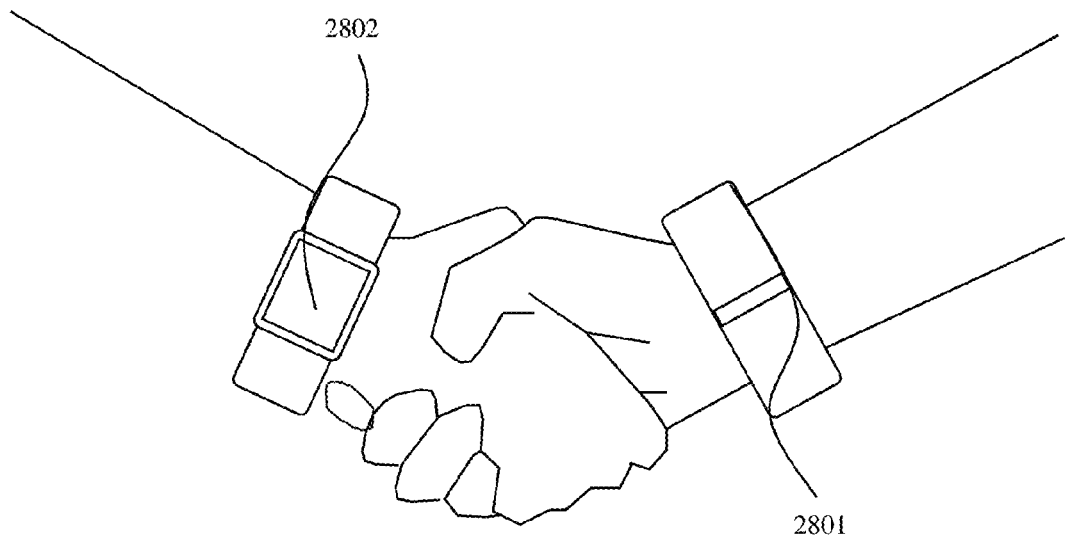
Figure 11G:
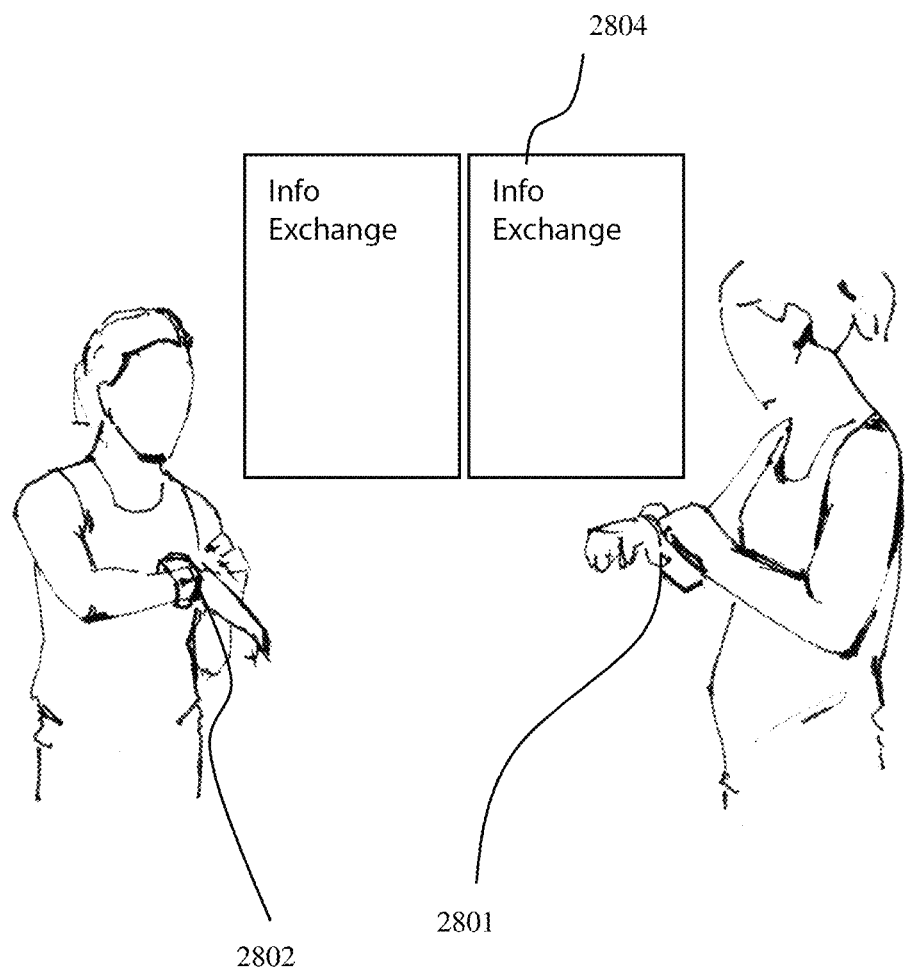

FIGS. 11A-11G illustrate a wearable device 2800 in use for sports according to another embodiment of present disclosure. Although not illustrated, wearable device 2800 can include an accelerator (not shown). Referring to FIGS. 11A to 11G, a first user wears a first wearable device 2801 and a second user wears a second wearable device 2802 in sports, e.g., boxing or running. After a game, match race etc., sports, the first user and the second user can perform a predetermined motion, e.g., handshake, salute, bow, hug, and folding one's arms, predetermined information can be exchanged via an internet, NFC or Bluetooth. For instance, after a game, match race etc., two athletes can shake hands with each other and they can share each other's contact information, running speed, consumed calories, and any other information according to the user's preset settings. For instance, referring to FIG. 11B, display assembly can display information screen 2803 having, for instance, time, LBS, velocity, counter, or calory information. As the user works out, as shown in FIG. 11D, information screen 2803 can show the current information. As shown in FIG. 11F, when the first and second users handshake, contact information, or exercise information can be exchanged. The first user and second user can exercise on their own with a significant physical separation and still communicate with one another. For instance, the first user could be jogging in Washington D.C. while the second user is walking in London, the first user and the second user can exchange workout information via the internet and even compete with or against one another by using the exercise information.

Figure 12A:
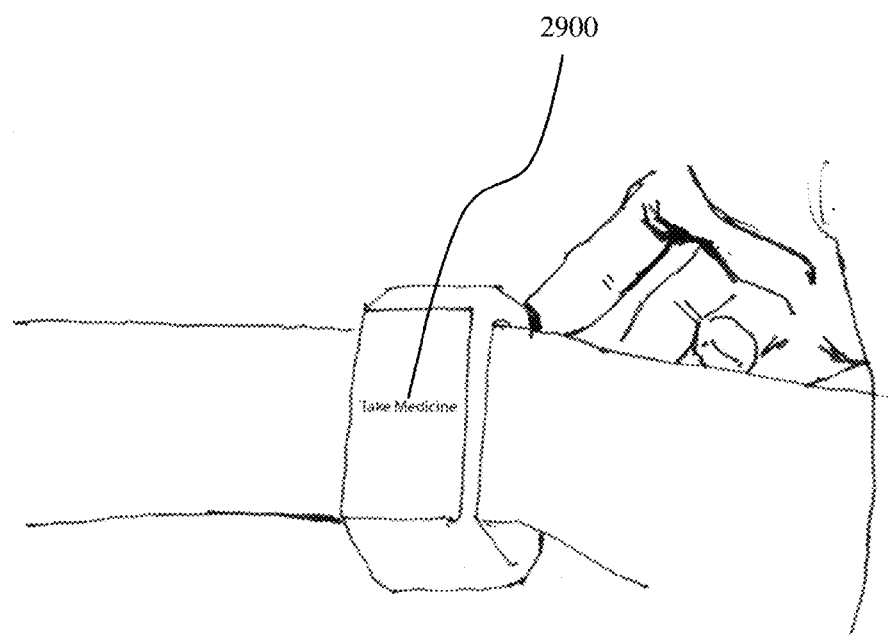
FIGS. 12A-12B illustrate a wearable device in use for medical management or medication administration and compliance according to another embodiment of present disclosure.
Figure 12B:
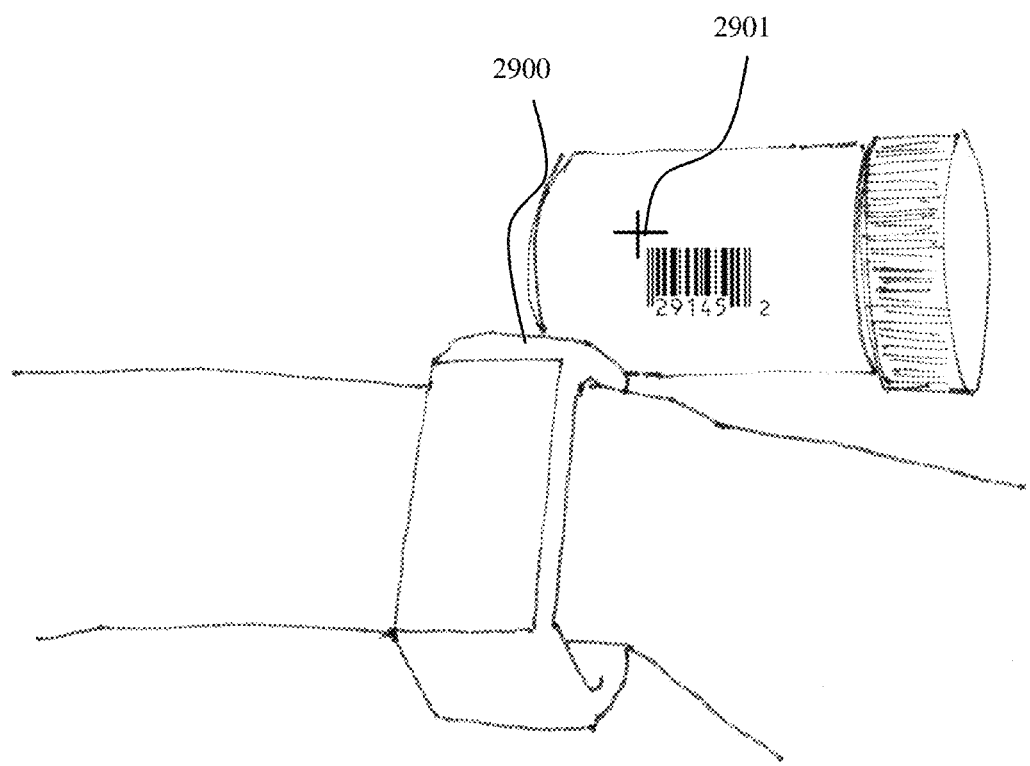

FIGS. 12A-12B illustrate a wearable device 2900 in use for medication management according to another embodiment of present disclosure. Wearable device 2900 can provide a user with an alert regarding a time and dose. For instance, if a doctor prescribes a specific medication to be taken twice a day with a specific of dosage, wearable device 2900 can alert the user by way of an alarm, either by a vibration, a sound, or a blinking light. As shown in FIG. 12B, once the user scans the barcode on a medication container, wearable device 2900 can verify whether the medication is correct or not. The wearable device can alert the user by way of an alarm until the proper barcode is scanned. Further, wearable device 2900 can communicate with a management server so that all medical records can be documented and reviewed by authorized personnel such as a doctor or nurse. A user or doctor can retrieve basic patient information by scanning MRN barcodes without the need for manual text input on a device. The idea of verification through text can lead to input errors and eventually result in obtaining incorrect patient data. By streamlining the scanning process so that it can be more accessible and convenient by having personal wearable scanning devices, we can eliminate manual input errors and have a safe and more secure tool for patient data retrieval.

In another embodiment, healthcare workers, more specifically nurses, can have real-time notifications regarding their tasks and could verify correct patient and medication information prior to administration by scanning barcodes with wearable device. In particular, the wearable device in handheld mode can serve as a lightweight accessible alternative as opposed to current bulky handheld scanners.

Referring to Table 1 and FIGS. 13A-13D, it will be described as a medical management tool according to another embodiment of the present disclosure.

Table 1 below explains current paint points, and solutions and benefits according to another embodiment of the present disclosure.

TABLE 1

| Process | Pain Points | Solutions | Benefits |
|---|---|---|---|
| Medication Administration & point of care | Incorrect medication Allergies towards medication Staff does not deliver medication at appointed time Medication contraindication Manual input of all administered medication | Scan MRN and Medication barcodes before administration Reminders on wearable device at time of administration Confirming medication and lack of contraindications by scan (Database cross-check) | Medication administration errors and related ADEs to a minimum Full liability of employee to administer the medication and medication tracking convenience Decrease manual input |
| Medication Re-order | Manual Input of numerous medications with various information is time consuming and could lead to medication errors Constant re-ordering per patient | Scan medication boxes for re-order while still allowing manual modification | Automated Re-order request through scan Decrease time and manual inputs Decrease medication information error Decrease time consumption Convenience |
| Paging system/ Call System | Lack of information for source of call Lack of information for reason of call Busy phone lines when calling back Lack of patient summary information Long response times | Caller location and patient information received with call notification, Confirmation of receipt of call and enroute confirmation Data for time response for better evaluation and control | Quick response to call Streamlined process Confirmation of available healthcare help Quick debrief while enroute to patient |
| Patient Information and Important Values | Constant physical documentation of "Scratch Paper Notes" Constant manual input of MRN to access patient information and results which might lead to lengthy process and patient mix-ups | Basic patient information including labs and investigation results can be retrieved by scanning patient's MRN barcode and utilizing the microphone to view specific lab results. | Convenience Less input errors Quick retrieval of valuable information Less time consumption |

A software application can be installed in wearable device 2900. The software application is configured to include a document record, UI (User Interface), database interface, data requirements, back-end data log and data analytics. The level of privacy and security are tangent with this information. Now, referring to FIGS. 13A-13D, various embodiments are described.

Figure 13A:
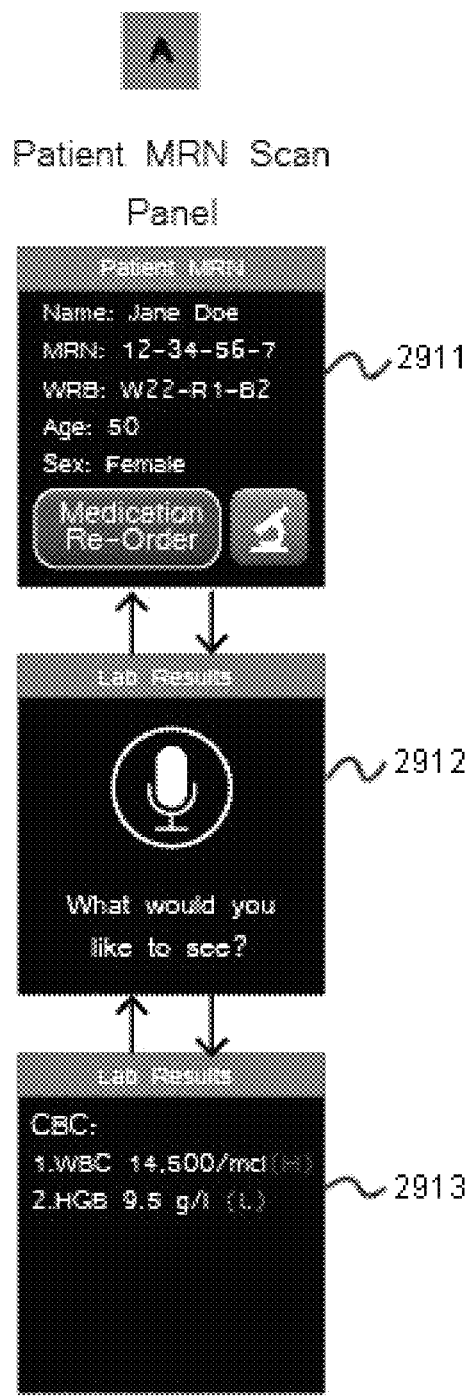
FIG. 13A illustrates a patient MRN (medical record number) information screen according to another embodiment.

FIG. 13A illustrates a patient MRN (medical record number) information screen according to another embodiment. A user can retrieve basic patient information by scanning MRN barcodes without the need for manual text input on a device. The method of verification through text could lead to input errors and eventually result in obtaining incorrect patient data. By streamlining the scanning process so that it would be more accessible and convenient through having a personal wearable device. It can eliminate manual input errors and provide a safe and secure tool for patient data retrieval. After gaining access to basic patient information on the first information screen 2911, more specific investigation and lab results can be viewed using the device's microphone and voice recognition. As second information screen 2912, wearable device 2900 can ask any question to the user. Upon receipt of the user's answer, specific information can be displayed on third information screen 2913.

According to another embodiment (not shown in Figures), database interface mode can be provided. Based on the scanned barcode serial, an API call coupled to control unit 140 can retrieve the related patient identification information. If necessary, voice recognition can be converted into a text and the API call is sent to the lab database to retrieve requested test results. Any date stored in wearable device 2900 can be saved in back-end software server.

Database interface mode may require 1) patient information, 2) lab information, 3) staff information, and 4) back-end data logs as below.

1. Patient Info

| a. | MRN |
|---|---|
| b. | First Name |
| c. | Middle Name |
| d. | Surname |
| e. | Ward |
| f. | Room/Bed |
| g. | D.O.B |
| h. | Gender |
| i. | Nationality |
| j. | Social Security Number/Passport ID |
| k. | Allergies |
| l. | Height |
| m. | Weight |

2. Lab Info

| a. | MRN |
|---|---|
| b. | Sample Name |
| c. | Investigation Name |
| d. | Lab Name |
| e. | Lab Result |

3. Staff Info

| a. | Employee number |
|---|---|
| b. | First Name |
| c. | Middle Name |
| d. | Surname |
| e. | Title |
| f. | Availability |

4. Back-End Data Logs

| I. | Employee ID |
|---|---|
| II. | Product ID |
| III. | MRN scanned |
| IV. | MRN scanned time |
| V. | Voice Command |
| VI. | Voice Command Time |

Wearable device 2900 can provide analytics as to whether a scan is made in a pre-defined time period, or whether a user is authorized one.

Figure 13B:
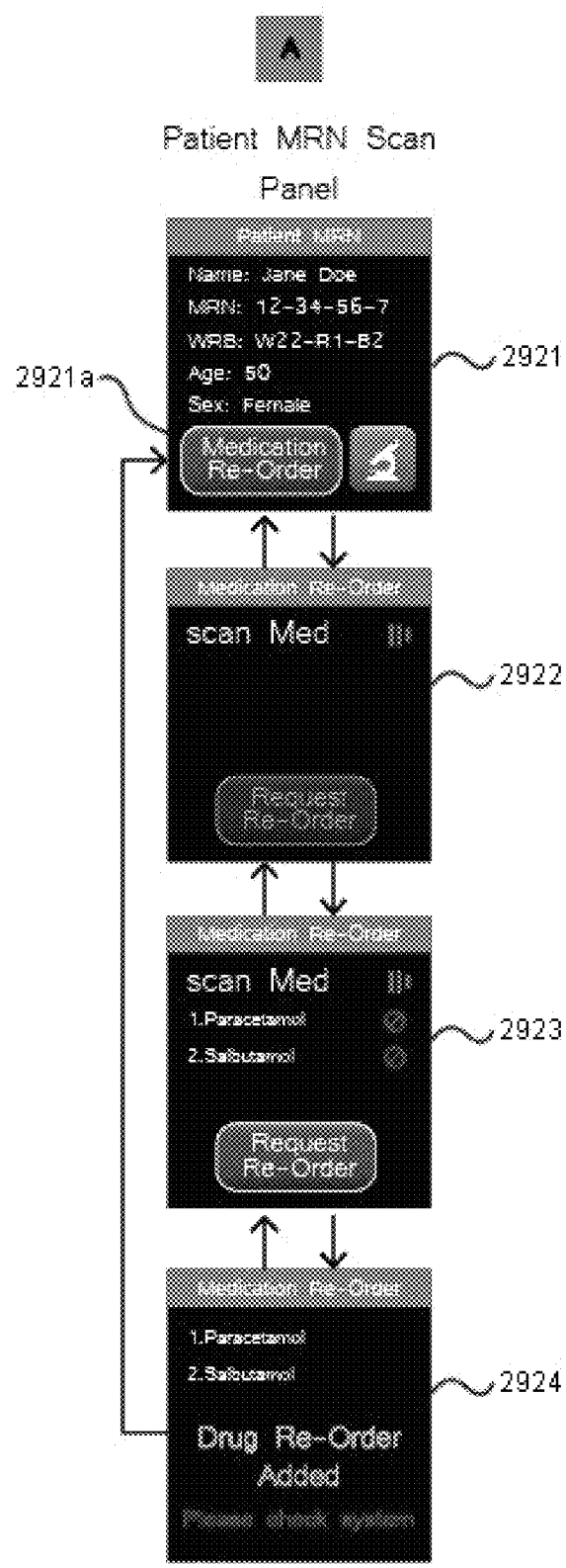
FIG. 13B illustrates a medication re-order mode with an information screen.

FIG. 13B illustrates a medication re-order mode with an information screen. A user can easily set-up medication re-orders by scanning routine patient medicine. After the wearable device 2900 scans a barcode on a medication container, display assembly will display relevant information on first information screen 2921. After the user hits a Medication Re-order button 2921a, second information screen 2922 starts to load data. As third information screen 2923 shows some relevant information that previously ordered, the user can conveniently confirm the order using touch screen. As shown in fourth information screen 2924, medication can be easily re-ordered. This flow of procedure decreases the redundancy of same manual inputs because wearable device 2900 can retrieve medical information from back-end log data. Medication re-order mode may require 1) patient information, 2) drug information, 3) staff information, and 4) back-end data logs as below.

Patient Info

| a. | MRN |
|---|---|
| b. | First Name |
| c. | Middle Name |
| d. | Surname |
| e. | Ward |
| f. | Room/Bed |
| g. | D.O.B |
| h. | Gender |
| i. | Nationality |
| j. | Social Security Number/Passport ID |
| k. | Allergies |
| l. | Height |
| m. | Weight |

Drug Info

| a. | Drug Barcode number |
|---|---|
| b. | Drug Name |
| c. | Drug Form |

Staff Info

| a. | Employee number | b. | First Name | d. | Surname |
|---|---|---|---|---|---|
| f. | Availability | c. | Middle Name | e. | Title |

Back-End Data Logs

| I. | Employee ID |
|---|---|
| II. | Product ID |
| III. | MRN scanned |
| IV. | MRN scanned time |
| V. | Voice Command |
| VI. | Voice Command |
| VII. | Drug Code Scanned |
| VIII. | Drug Code Scanned Time |
| IX. | Drug Re-Order Request Status |
| X. | Drug Re-Order Request Time |

Figure 13C:
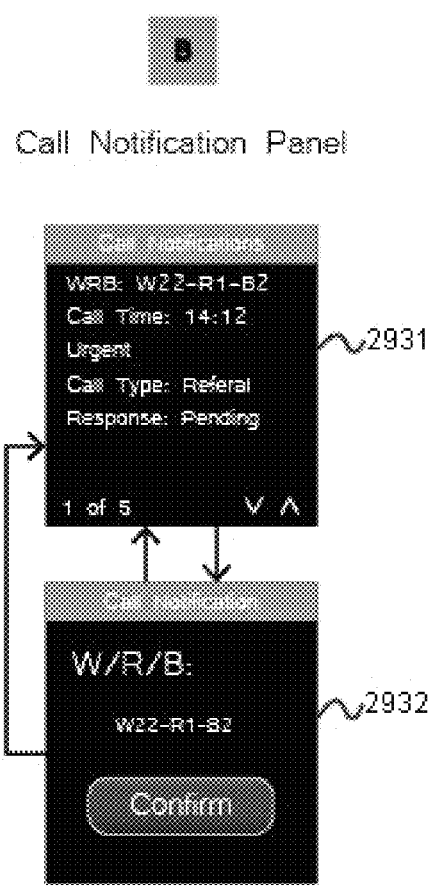
FIG. 13C illustrates a call notification mode with an information screen.

FIG. 13C illustrates a call notification mode with an information screen. A healthcare personnel would have a quicker & more informative process for pager calls. Conventionally when a staff member receives a call on his/her pager or communication device and the he/she needs to return the call to obtain more information. A user can receive a notification as shown in first information screen 2931. The wearable device 2900 is coupled to back end data log. Since back end data log stores contact information, when the user receives the notification, the user also receives any information about the sender. If the notification requires any action as shown in second information screen 2932, for instance, the user can reply to the sender by touching the screen. Call notification mode may require 1) staff information and 2) back-end data logs as below.

Staff Info

| | |
|---|---|
| a. | Employee Number |
| b. | First Name |
| c. | Middle Name |
| d. | Surname |
| e. | Title |
| f. | Availability |
| g. | Pager Number/Calling Code |

Figure 13D:
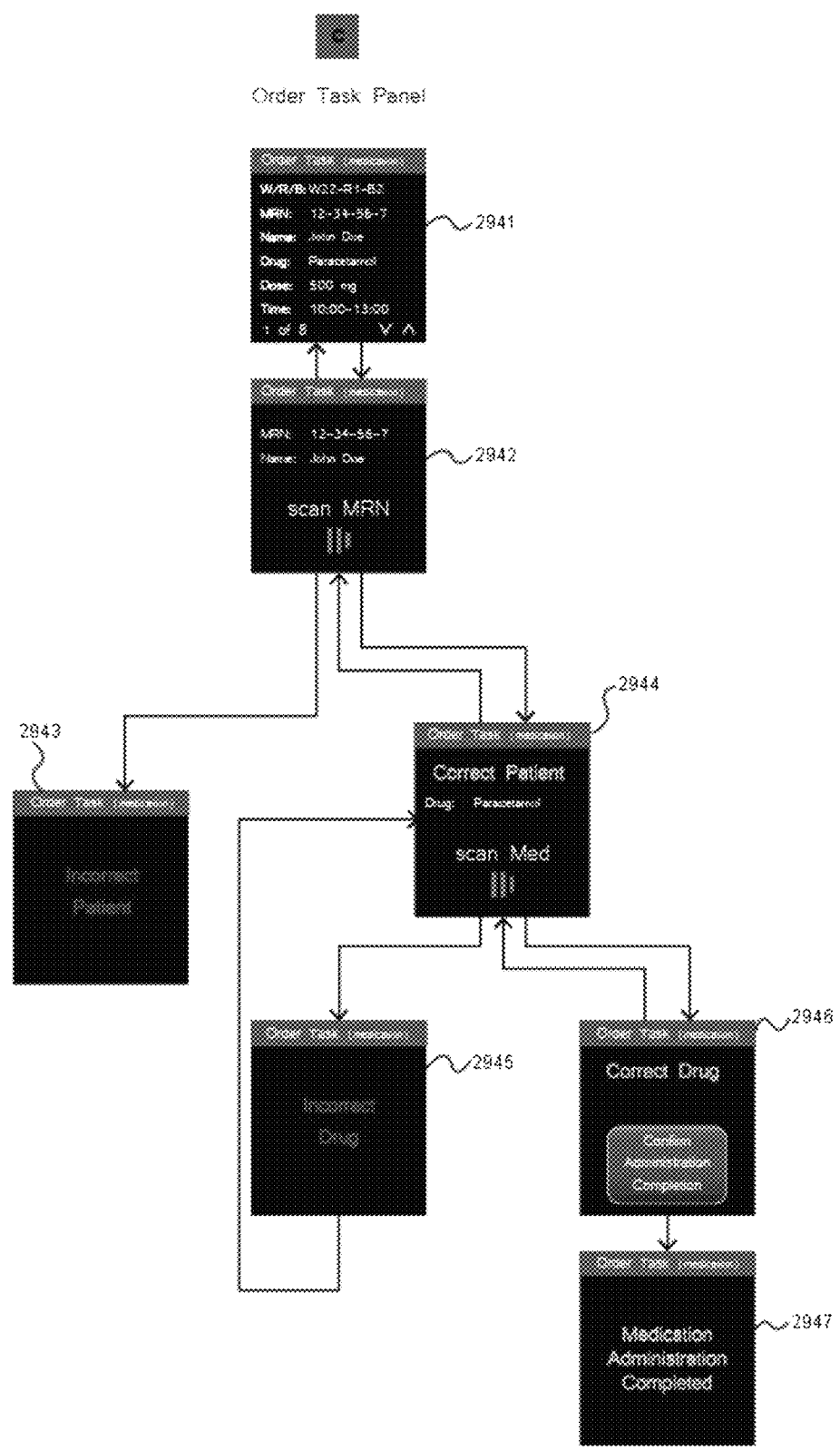
FIG. 13D illustrates an order task mode with an information screen.

Back-End Data Logs
I. Notification Serial Number
II. Caller Employee Number
III. Receiver Employee Number
IV. Product ID
V. Notification Time
VI. Type
VII. Response Time FIG. 13D illustrates an order task mode with an information screen. Currently, physicians and nurses handle various kinds of orders including blood samples and a number of medications. Nurses have to extract such order data from computer stations or physical documents. To reduce the time this process takes, according to another embodiment of the present disclosure, wearable device 2900 can handle the scheduling flow. For instance, referring to FIG. 13D, after first screen 2941 shows basic information about the patient, the nurse can scan the MRN of the patient to verify him as instructed in second information screen 2942. If the scanned patient is not correct one, third information screen 2943 will give a notice that the patient is incorrect. When it is the correct patient, it moves to the next step and asks the nurse to scan the medications shown in the fourth information screen 2944. When the nurse scans the barcode on the medication bottle, if it is the incorrect medication, the fifth information screen 2945 indicates that it is incorrect. When it is the correct one, the sixth information screen 2946 will indication on the display that it is the correct medication and ask the nurse to confirm if the administration of the medication is completed. When it is completed, the seventh information screen 2947 displays the progress of the actions taken.

Scanning patient's MRN barcode and medication will ensure a secure and safe administration of the correct medication. Order task mode may require 1) patient information, 2) Drug information, 3) staff information, 4) Staff information, 5) physician orders, 6) back-end data logs as below.

Patient Info

| | |
|---|---|
| a. | MRN |
| b. | First Name |
| c. | Middle Name |
| d. | Surname |
| e. | Ward |
| f. | Room/Bed |
| g. | D.O.B |
| h. | Gender |
| i. | Nationality |
| j. | Social Security Number/Passport ID |
| k. | Allergies |
| l. | Height |
| m. | Weight |

Drug Info

| | |
|---|---|
| a. | Drug Barcode Number |
| b. | Drug Name |
| c. | Drug Form |

Staff Info

| | |
|---|---|
| a. | Employee number |
| b. | First Name |
| c. | Middle Name |
| d. | Surname |
| e. | Title |
| f. | Availability |

Physician Orders

| | | | | | | |
|---|---|---|---|---|---|---|
| a. | MRN | c. | Middle Name | e. | Drug Number (Medication) |
| b. | First Name | d. | Surname | | |
| f. | Drug Name (Medication) | i. | Route (Medication) | l. | Frequency (Medication) |
| g | Form (Medication) | j | PRN (Medication) | m. | Duration (Medication) |
| h. | Dose (Medication) | k. | Start (Medication) | n. | Type (Investigation) |

Back-End Data Logs

| | |
|---|---|
| I. | Notification Serial |
| II. | Employee ID |
| III. | Product ID |
| IV. | Time Received |
| V. | Time Scheduled for POC |
| VI. | MRN Scanned (Medication) |
| VII. | MRN Scanned Time (Medication) |
| VIII. | MRN Response (Medications) |
| IX | Drug Code Scanned (Medication) |
| X. | Drug Scanned Time (Medication) |
| XI. | Drug Response (Medication) |
| XII. | POC Response (Medication) |
| XIII. | POC Response Time (Medication) |
| XIV. | POC Response Time (Investigation) |

Figure 14A:
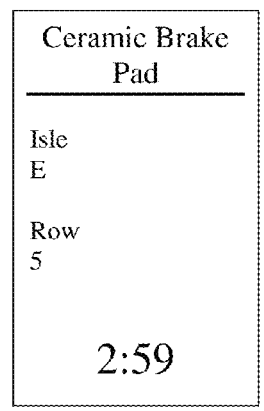
FIGS. 14A-14C illustrate a wearable device in use for inventory management according to another embodiment of present disclosure.
Figure 14B:
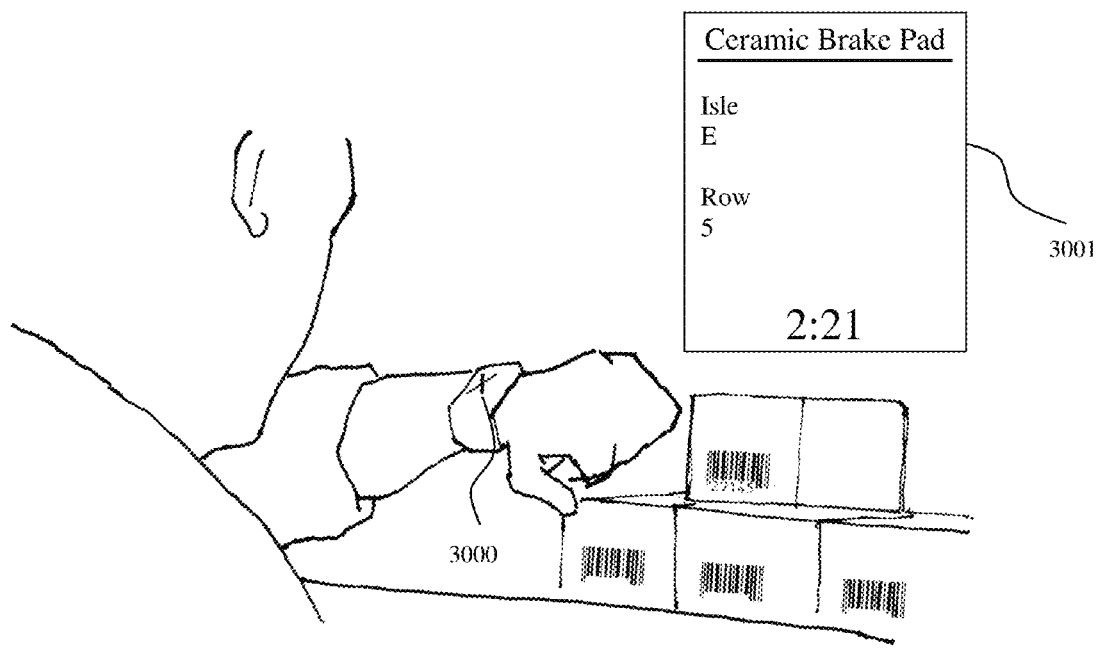
Figure 14C:
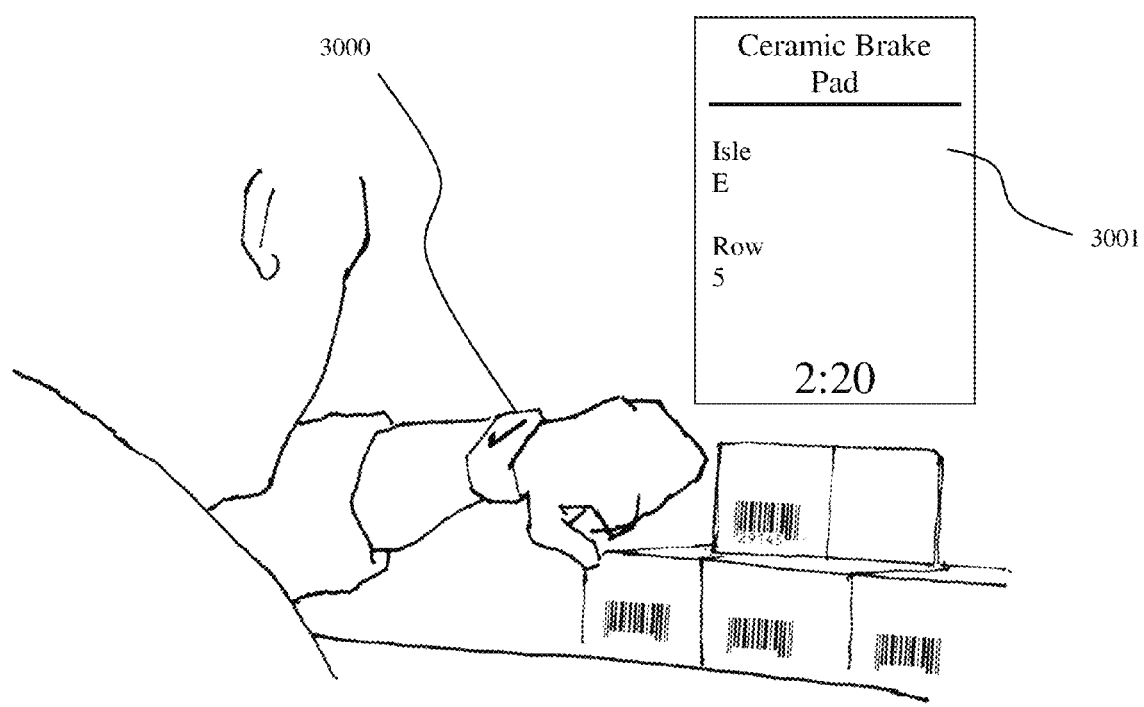

FIGS. 14A-14C illustrate a wearable device 3000 in use for inventory management according to another embodiment of present disclosure. Referring to FIGS. 14A-14C, wearable device 3000 can easily scan inventory item. When wearable device 3000 scans any inventory item, information screen 3001 can display inventory information such as a isle letter or a row number. Further, wearable device 3000 can help the user to find a location of the targeted item showing the isle letter or the row number in the inventory when the item is scanned in a showroom. After the user moves to the indicated isle letter and row number, the wearable device can also verify whether the scanned one at the indicated place matches the item scanned in the showroom. Regarding inventory management, any instructions and notifications can be displayed on information screen 3001. Wearable device 3000 can be converted into handheld scan which is more accessible to a distant or difficult spot to scan.

In another embodiment, considering that freight management has a lot of field work and requires accurate tracking and scanning, bulky handheld scanners could be too heavy and cumbersome while transporting different shipments considering the user is frequently moving, lifting, and transporting goods. The ability to have a lightweight wearable device that converts into a handheld scanner would prove to be more reliable and a more convenient solution for organizing, transporting, and moving packages with various sizes and storage positions.

Figures 15A, 15B:
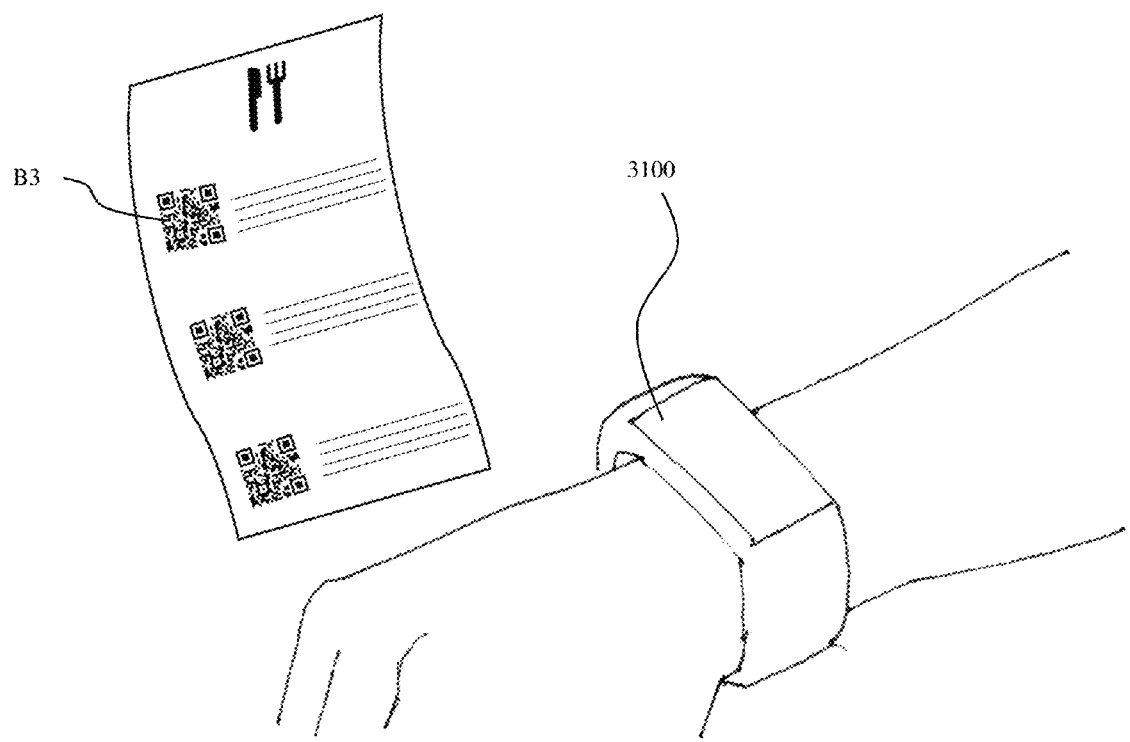
FIGS. 15A-15D illustrate a wearable device in use for menu selection at a restaurant according to another embodiment of present disclosure.
Figure 15C:
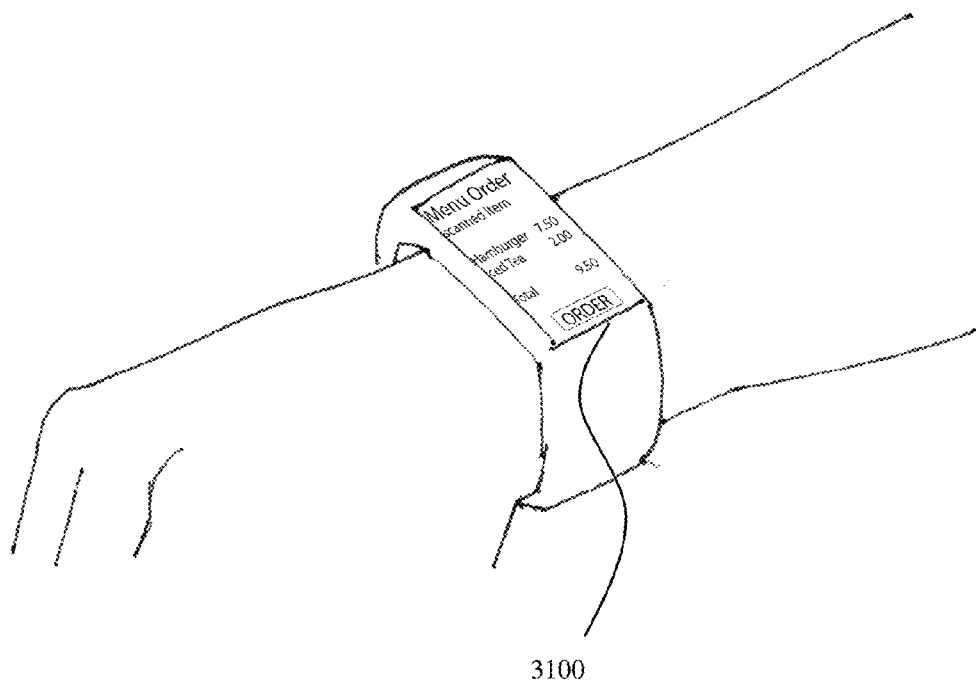
Figure 15D:
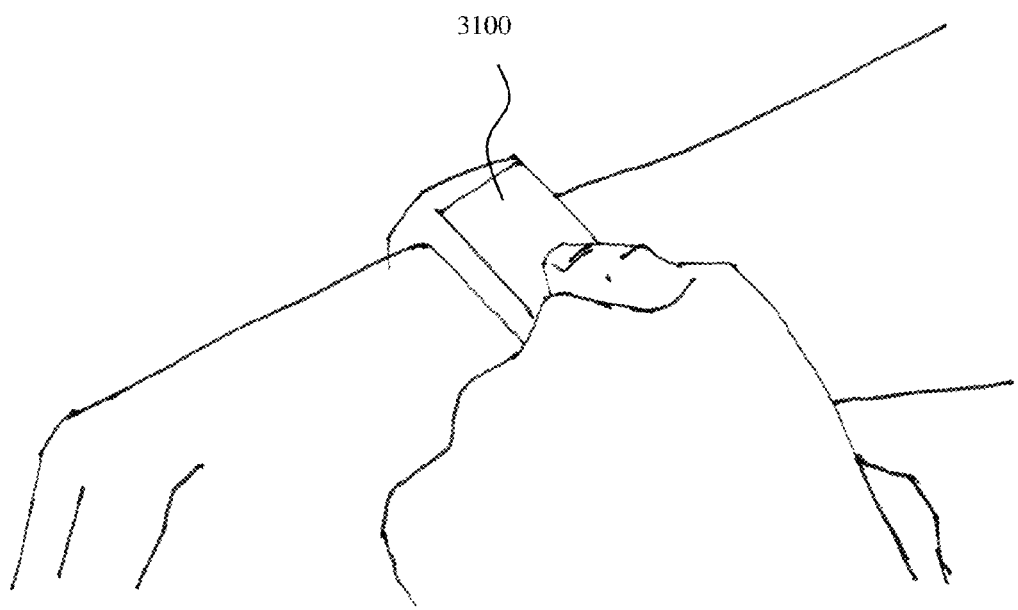

FIGS. 15A-15D illustrate a wearable device 3100 in use for menu selection at a restaurant according to another embodiment of the present disclosure. Referring to FIGS. 15A-15D, a user can scan menu information, place an order and, pay for the meal via the wearable device 3100. In particular, referring to FIG. 15A, the user can scan a barcode B3 on menu and, as shown in FIG. 15A, can see price information of scanned dish on information screen 3101. The user can pay for the food with the wearable device 3100, for instance, by swipping a finger on the information screen 3101.

According to these embodiments of the present disclosure, the wearable device provides a user with quick access to a fully-personalized scanner, a lightweight body with minimum components, and versatile purposes for different environments.

The wearable device can act as a convertible smartwatch that can be used for conventional consumer smartwatch applications (such as notifications, reminders, sensor data, etc.) and at the same time as a wearable scanner with the capability to directly scan information without being removed from a user's wrist.

The wrist band unit 110 contains a sensor and a circuit to identify which length adjustable feature 110a has integrated into the display assembly.

Figure 16A:
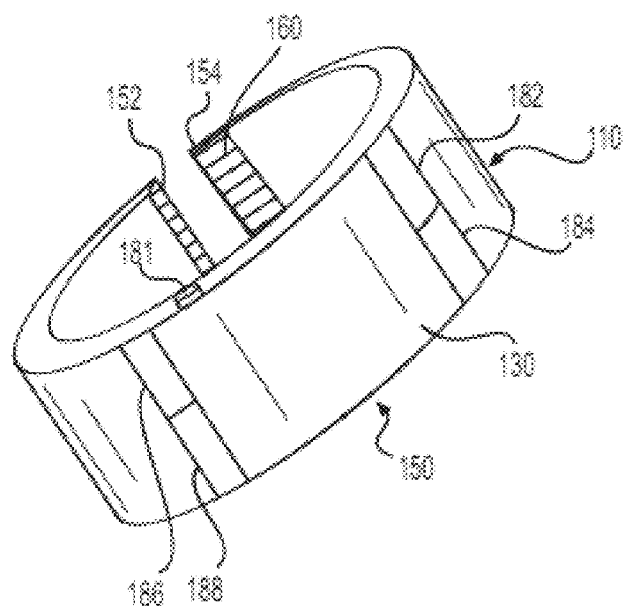
FIG. 16A is a front perspective view of a wrist band that is usable with the present disclosure.
Figure 16B:
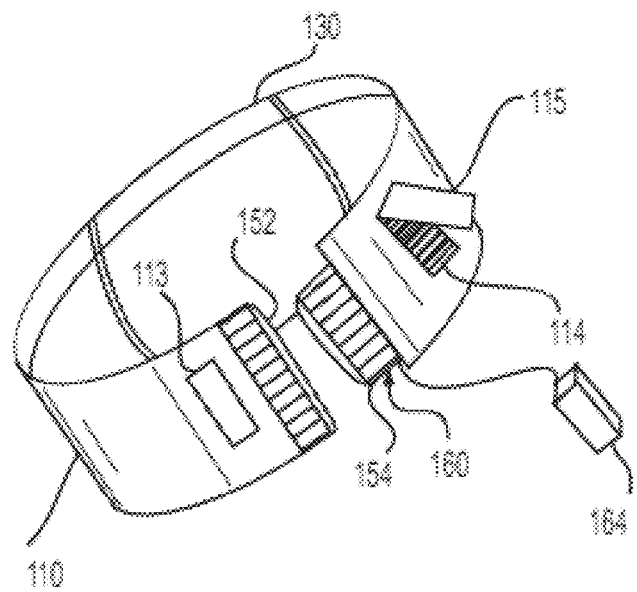
FIG. 16B is a rear perspective view of the wrist band depicted in FIG. 16A, but depicting a cover over one end.
Figure 16C:
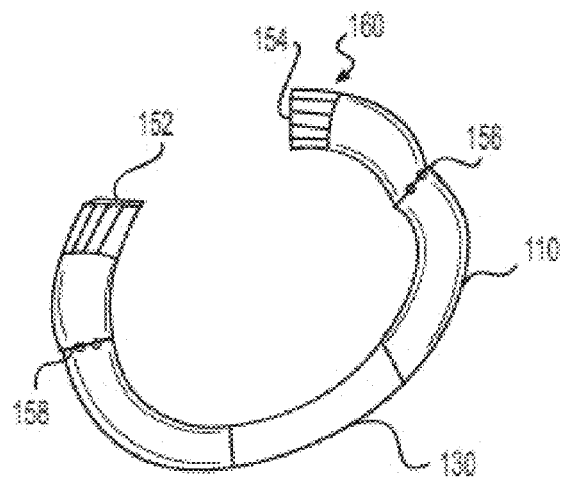
FIG. 16C is a plan view of the wrist band depicted in FIG. 16A.

According to another embodiment of the present disclosure, with reference to FIGS. 16A, 16B, 16C, 17, 18, and 19, wearable device 100 is depicted in greater detail in a presently preferred embodiment. Wrist band 111 comprises a central, preferably flexible or segmented arcuate section and two end sections 152 and 154. End sections 152 and 154 in a preferred embodiment are normally spaced apart when wrist band unit 110 is not being worn on the wrist of the user, but are attachable to one another and maintained in contact by some means, such as a magnetic coupling in a presently preferred embodiment, but could also be attached by a mechanical linkage assembly. In order to permit end sections 152 and 154 to meet together so that the wrist band unit 110 can be placed on the wrist of a user, end sections 152 and 154 are hinged to central portion 150 with hinges 156 and 158, as depicted in FIG. 16C.

Wrist band end section 152 is comprised of an insulated magnetic unit (not shown). Wrist band end 154 includes a memory unit 116, as described above with respect to FIG. 1. Wrist band end section 152 permits a direct mechanical connection of memory unit 116 to, for example a computer (not shown), or a charger (not shown), or through a converter cable (not shown) to a wearable device. Wrist band end section 154 is also coupled to a electrically connectable Universal Serial Bus (USB) terminal 160 that together with memory unit 116 is preferably a conventional flash drive. Memory unit 116 stores computer programs, such as those depicted in FIGS. 24-26, 28, 30 and 31, as well as stores certain data and information generated in wearable device 100 or received by wearable device 100 as an input. As discussed below, such data includes biographic information about the user, information needed to couple with computing device 100, social information, and task and calendar information. Most of this information is stored in memory 116 and is generated in or forwarded by computing device 10 such as a smart phone to wearable device 100. An example of information generated in wearable device 100 and stored in memory 116 is motion information generated by motion detectors 118 and 119. Wrist band unit 110 can include a plurality of notification lights 182, 184, 186, and 188 which display certain statuses of a routine that wearable device 100 is executing. For example, when wearable device 100 receives a NFC signal, one of the notification lights 182, 184, 186, and 188 can blink to notify the user of the receipt of the NFC signal. Wrist band unit 110 can also include an ON/OFF switch 181 as depicted in FIG. 1.

Insertable over end 154 is a magnetic permeable or magnetic, metallic USB cover 164 (See FIG. 16B). Metallic USB cover 164 when applied or attached over end 154 provides a base for a magnetic coupling of end 154 with end 152, which is also made of a permeable magnetic or magnetic material. In alternative embodiments, cover 164 can be connected to end 154 by a strap or line, or by a hinged connection.

Figure 17:
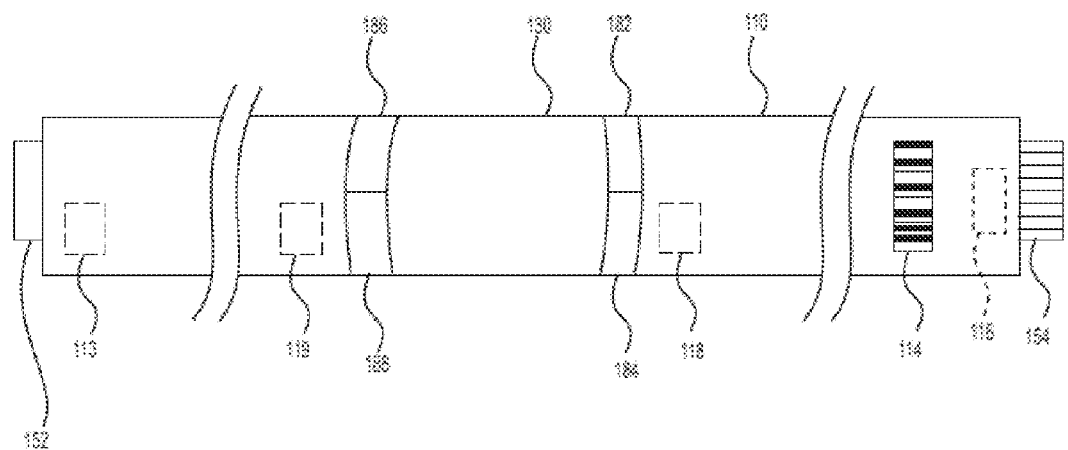
FIG. 17 is a front elevational, expanded, layout view of the wrist band.
Figure 18A:
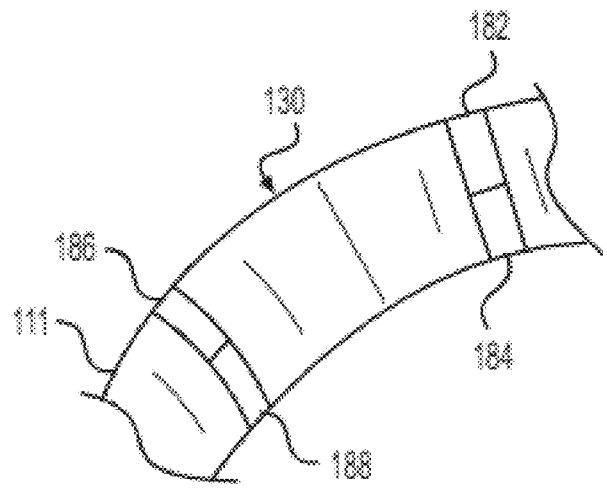
FIGS. 18A, 18B and 18C are front perspective views of the wrist band that shows a rotation of the display assembly with respect to wrist band.
Figure 18B:
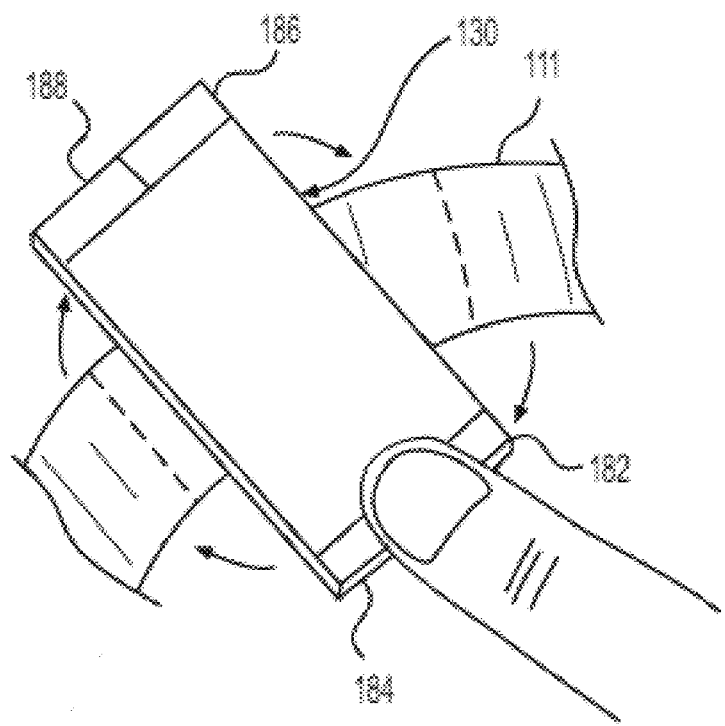
Figure 18C:
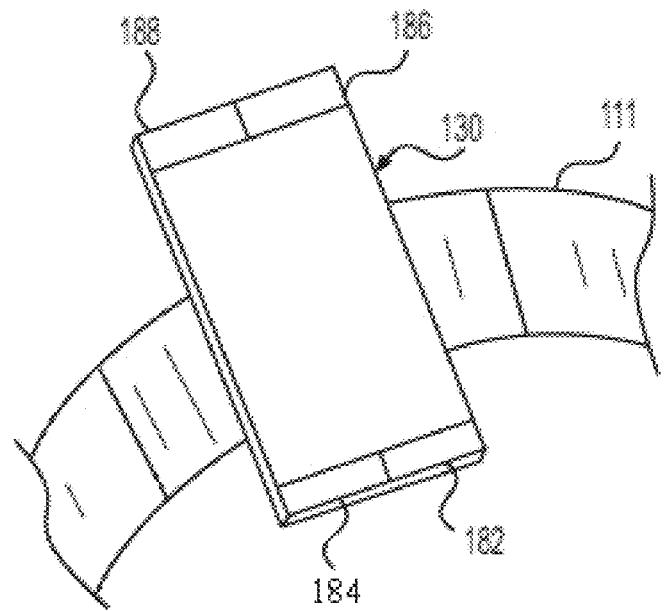

Display unit 130 is preferably centrally located on a middle section of wrist band 111, as depicted in FIG. 16A. Mounted to wrist band 111 on either side of display unit 130 are a pair of conventional accelerometers or motion detection units 118 and 119, as depicted in FIG. 17, that provides an output of arm movement information (distance, velocity, and acceleration). Display unit 130 is preferably rectangular in shape and is rotatably attached to watch band 111 (see FIGS. 18A-18C). The user can rotate the rectangular display 90 degrees. An orientation sensor (not shown) can also be used to display the information in either a landscape format or a portrait format. Such an orientation sensor is conventional and can be linked to the position of watch band 111 or to the rotational position of display unit 130.

Figure 19:
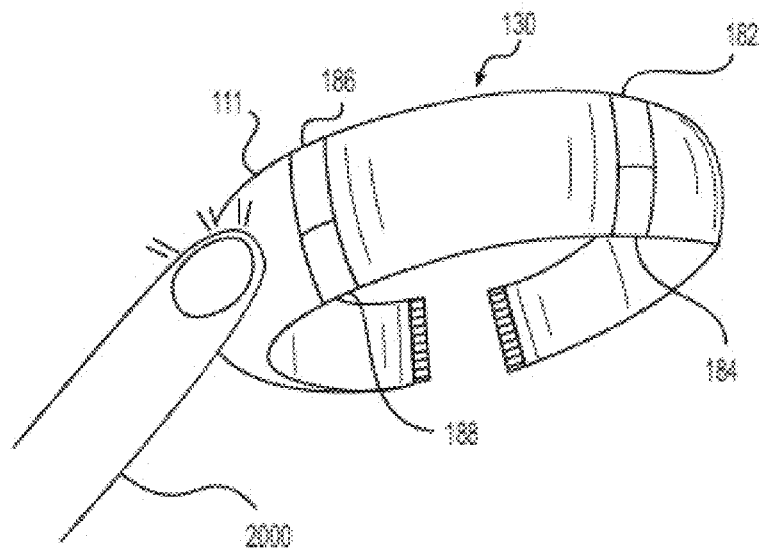
FIG. 19 is a front perspective view of a wrist band that includes a home button function when the user touchs the wrist band with his finger.

Wrist band unit 110 can also be comprised of a touchpad/screen layer. With reference now to FIG. 19, such touchpad is configured to function as a reset/home button. The reset/home button is programmed to perform a desired task by a predetermined input. An representative of a such predetermined input includes a number of finger pressures, a number of touches, and touch time. For instance, FIG. 19 demonstrates that a wrist band functions as a home button when the user touchs the wrist band with his or her finger. When the user taps the touchpad located on wrist band 111 once with one finger 2000, then the input functions as a "select button" command. For example, when the user taps the touchpad located on wrist band 111 twice with one finger 2000, then the input functions as a "home button" command. When the user taps the touchpad located on wrist band 111 thrice or three times with one finger 2000, then the input functions as a "scroll/cancel" command. Two touchpads (not shown) can be located on wrist band 111 on each side of display assembly 130. Each of the two touchpads can be used as a mouse or a controller. When the first wearable device 100 is wirelessly coupled to a network device such as a computer, TV, and video game, the user can touch and control at least one of the touchpads so that the user can use the touchpads to provide extra information to first wearable device 100. These examples of the present disclosure have been disclosed for illustrative purposes only. One of ordinary skill in the art will appreciate that various modifications, additions and substitutions are possible, without departing from the spirit of the disclosure.

Figure 20A:
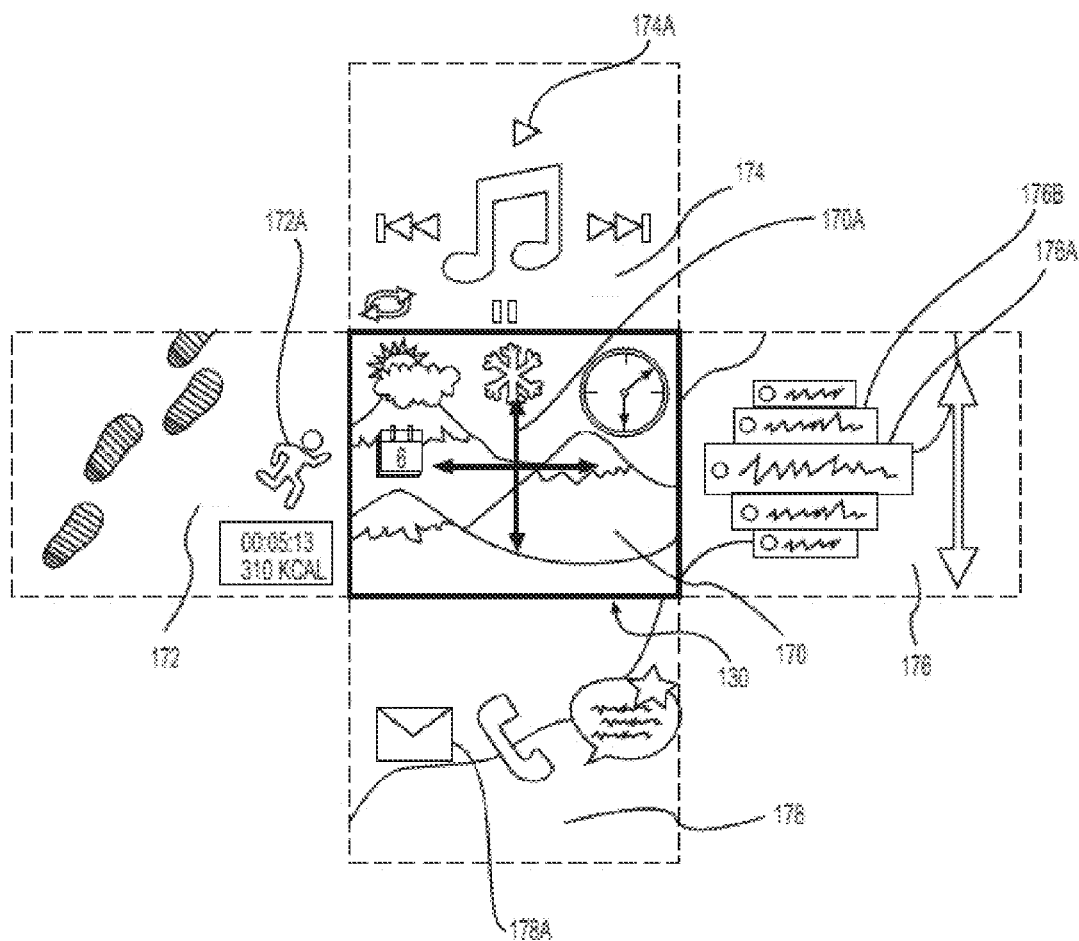
FIGS. 20A, 20B, and 20C are screen shot a variety of selectable outputs of the wearable device display.
Figure 20B:
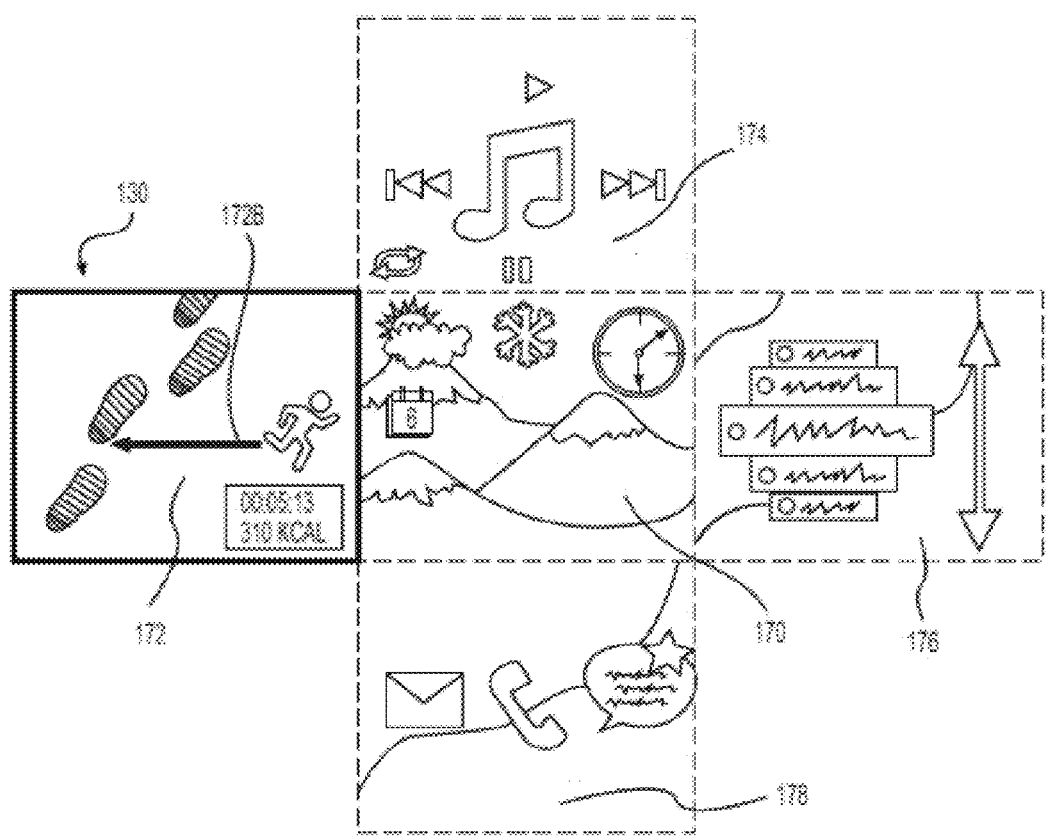
Figure 20C:
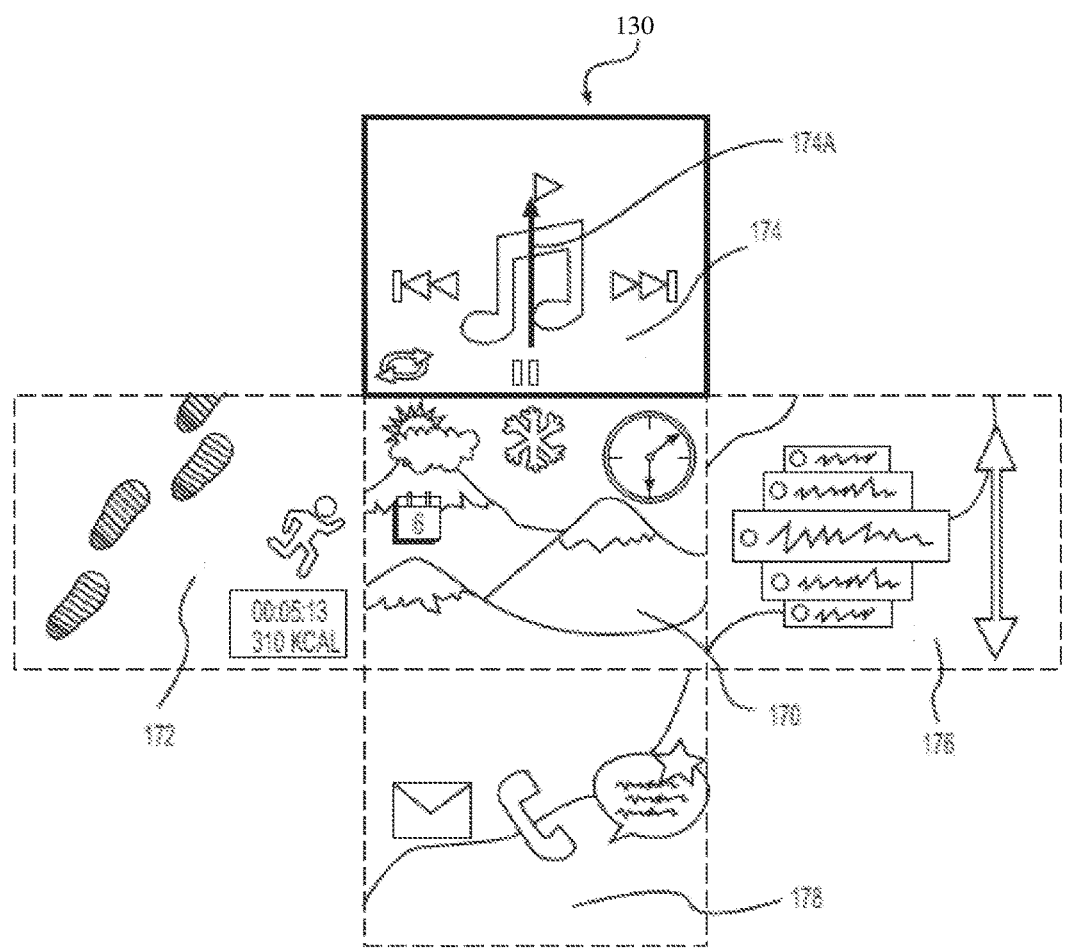

With reference now to FIGS. 20A-20C, display assembly 130 has a home screen 170 and a plurality of a first, a second, a third, and a fourth dependent screens 172, 174, 176, and 178, which are displayed depending upon the function being performed or by the user switching manually between them. In this embodiment, four dependent screens are depicted, but the total number of the dependent screens is not limited thereto. One home screen 170 and four dependent screens 172, 174, 176, and 178 forms a cross-shaped interface or User Plus Interface (UPI).

From FIGS. 20A-20C, solid lines around a screen refer to the status of the screen that is currently visible on display assembly 130. Dashed lines around a screen refer to the status of the screen as being currently invisible to the user. For example, according to FIG. 20A, home screen 170 is depicted being surrounded by solid lines, and thus home screen 170 is a current screen that the user can see on display assembly 130. The plurality of dependent screens 172, 174, 176, and 178 are depicted being surrounded by dashed lines and thus such dependent screens 172, 174, 176, and 178 are invisible or hidden on a current mode. The user can swipe his or her finger on the current screen either vertically or horizontally in one of the indicated directions of arrows 170A to switch from the current screen to one of the other screens.

Home screen 170 shows various factors including time, date and weather. First dependent screen 172 can show a distance the user has run or calories the user has burned. As the user wearing first wearable device 100 walks, first dependent screen 172 shows an animated running man icon 172A. The animated running man icon can be programmed to show a running animation corresponding to the user's walking speed.

Second dependent screen 174 can display an audio player. Display assembly 130 can be comprised of either a touchpad or a touch screen to receive an input from the user. For example, when display assembly 130 is comprised of a touchpad, the user can tap the screen with one finger to play or pause the audio player.

Third dependent screen 176 is configured to show a list of schedules. A current schedule 176A can appear larger than a previous schedule 176B. Third dependent screen 176 can be configured to display a list of other various activities including performances the first wearable device 100 has operated.

Figure 21:
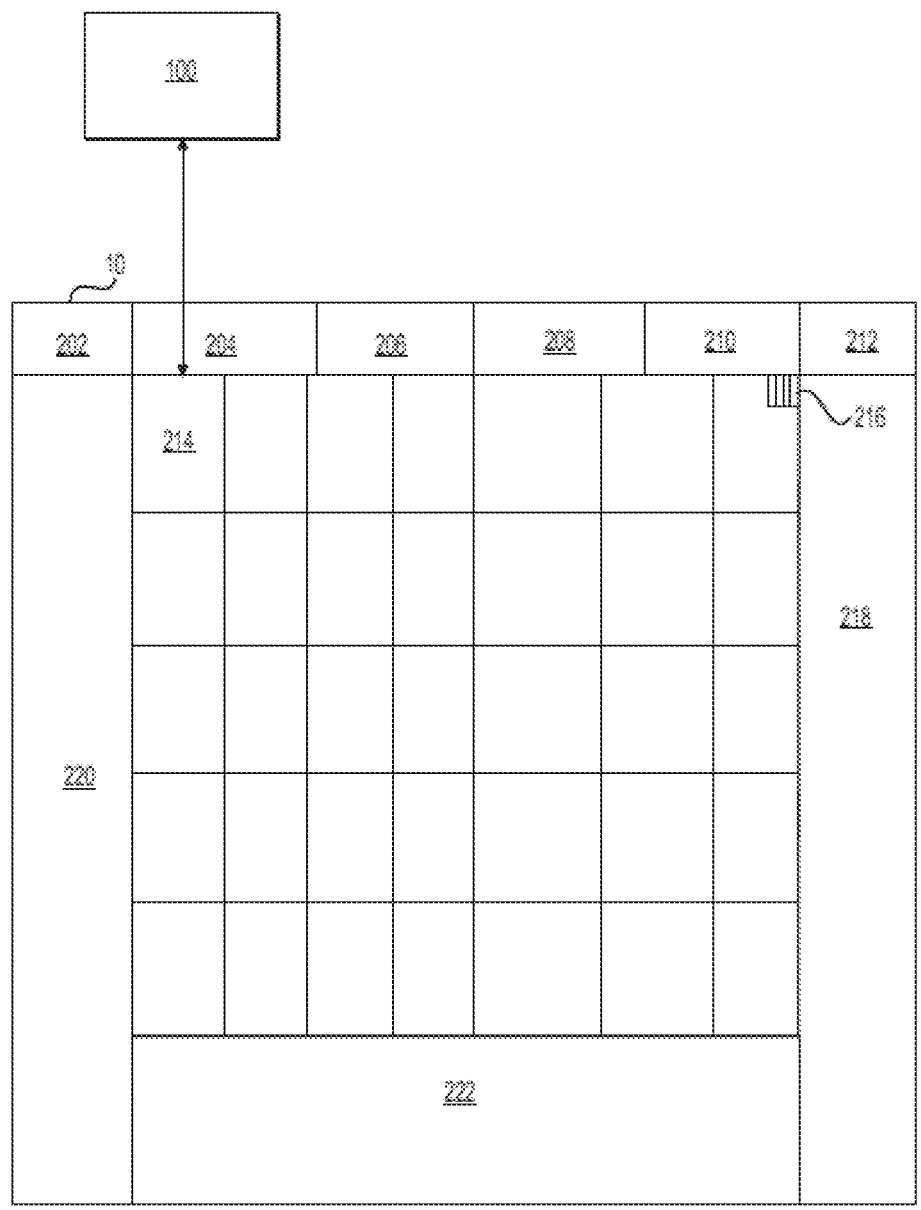
FIG. 21 is a general schematic table of exemplary blocks, referred to as "acti-blocks," which are updated in real time and displayed on the screen of smart phone.

Fourth dependent screen 178 is configured to display notification and any recent updates from a acti-block 214 (see FIG. 21). For example, fourth dependent screen 178 includes an e-mail icon 178A. When the user touches e-mail icon 178A, fourth dependent screen 178 shows the e-mails the user has received.

When the user desires to switch a screen from home screen 170 to first dependent screen 172, the user can touch and drag his finger from left to right on display assembly 130. After the user switches the screen, first dependent screen 172 becomes visible, and the other screens 170, 174, 176, and 178 become invisible or hidden, as depicted in FIG. 20B. The user can return back to home screen 170 by dragging his finger on display assembly 130 in a direction of arrow 172B. Display assembly 130 can be configured to include a setting that switches a pending screen to either home screen 170 or any specific dependent screens 172, 174, 176, and 178. For example, display assembly 130 can be configured to switch screens according to the type of inputs by fingers. If the user taps the screen twice with two fingers, then display assembly 130 can switch the screen back to home screen 170. If the user taps the screen thrice or three times with three fingers, then then display assembly 130 can switch the screen to third dependent screen 176. If the user taps the screen four times with three fingers, then then display assembly 130 can switch the screen to fourth dependent screen 178. Although the exemplary of the present screen displays of the disclosure have been disclosed for illustrative purposes, those skilled in the art will appreciate that various modifications, additions and substitutions are possible, without departing from the scope and spirit of the disclosure.

In summary, to switch modes of home screen 170, the user drags his or her finger from top downwardly on display assembly 130 and obtains second dependent screen 174A, as depicted in FIG. 20C. Second dependent screen 174 becomes visible, and other screens 170, 172, 176, and 178 become hidden or invisible. The user can return back to home screen 170 by dragging his finger on display assembly 130 in a direction of arrow 174A. For example, in a preferred embodiment, as depicted in FIG. 20A, different screen can be selected from a pending screen by swiping either vertically or horizontally in a direction of an arrow 170A.

With reference now to FIG. 21, a diagrammatic illustration of an interface screen between first computing device 10 and first wearable device 100 (see FIG. 1) is illustrated. An interface of acti-block computer program includes a plurality of buttons on the screen of computing device 10. Acti-block computer program provides a Social Network Service which is a platform to build social networks or social relations among people who, for example, share interests, activities, backgrounds, or real-life connections. FIG. 21 depicts a user interface of acti-block computer program screen on computing device 10 such as a smart phone or iPod. Acti-block computer program interface includes a logo and home page button 202, a biographic information button 204, a photo album button 206, a message button 208, a grouping information button 210, a notification button 212, acti-block 214, and a statistics button 216, a status update button 218, and control panel tab 220.

Logo and home page button 202 shows a logo of a company and when pushed or tapped by the user, switches the screen to a home screen. Biographic information button 204 includes a link to a profile information of the user. Photo album button 206 has a link to a plurality of photographs and photographic information that the user or his or her friends have uploaded or shared. Message button 208 is conventionally configured to send and receive a message to a friend.

Grouping information button 210 includes conventional algorithms based on tags or common factors. For example, when the user updates his profile or photos, he or she can create and update related tags as well. If the user is interested in a basketball game, grouping information button 210 can display any relevant information related to the basketball game as a result of a search based on the tags. Posting updates button 210 shows any updates the user or the user's friends made recently. Notification button 212 shows any new message from another compatible user, an email invitation, a listing of friends, and updates on comments. Acti-block 214 is configured to update data according to inputs from first wearable device 100. Acti-block 214 is configured to have a calendar-like function which displays dates.

Acti-block 214 is configured to be connected and be updated by activities of first wearable device 100. For example, if the user wearing first wearable device 100 runs 4 miles, then the distance information received from first wearable device 100 is transferred to computing device 10 and acti-block 214 is updated with such information automatically. In this way, acti-block 214 can contain any activity information received from first wearable device 100. Such activity information can contain calories, kind of food the user had, budget, list of groceries, profile of friends the user met and any other activities conducted on daily bases. For example, the user can scan several items the user bought with a help of a scanner disposed in first wearable device 100 and first wearable device 100 can calculates the price of the items bought and deduct the price of the items from the predetermined monthly budget. Thus, first wearable device 100 can calculate and transfer the information to the acti-block computer program such that the actiblock computer program can display the information such as remaining available funds for the month. Statistics button 216 is configured to show statistics of activities performed in the acti-block computer program. For instance, statistics button 216 can show the calories the user burned for the last one month, a distance the user has walked for the last one month or a monthly budget history calculating and displaying a budge surplus and deficit based on the information the first wearable device 100 scanned. Status update button 218 shows any new updates. Control panel tab 220 can be configured to create new tabs according to the user's needs such that the user can control and organize his events. A support tab 222 can be configured to display any contact information of the user's friends, any help message, problem reports or the like in a conventional manner.

Figure 22:
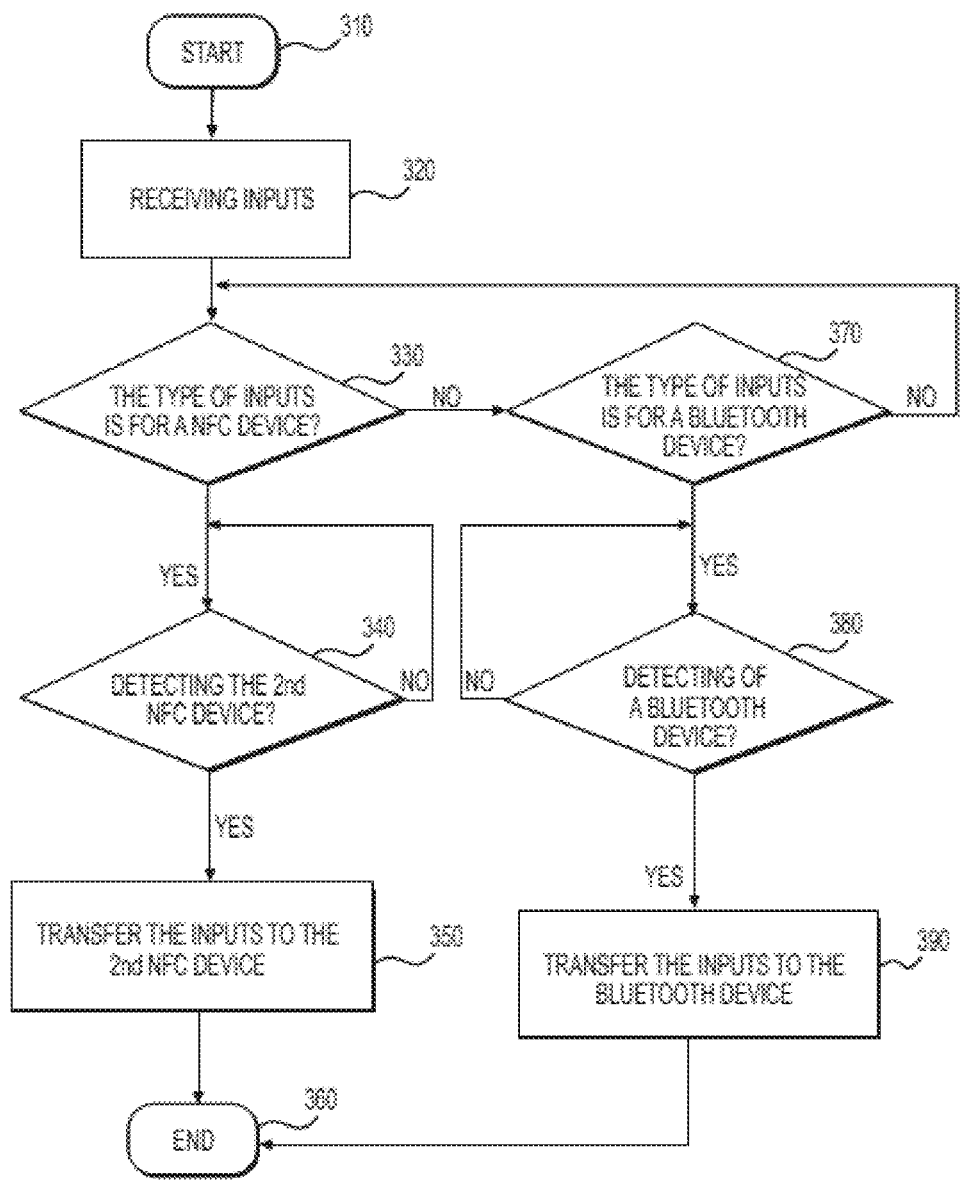
FIG. 22 is a specific schematic flowchart of an input and interface subroutine that is used to direct the flow or transfer of information received by wearable device.

According to a predetermined setting, first wearable device 100 can transfer information either to another second wearable device 100 (see FIG. 1) or to computing device 10. With reference now to FIG. 22, a subroutine for determining where to transfer input information is depicted. The subroutine begins at a start terminal 310 and proceeds to a step 320 where input information and data to first wearable device 100 is obtained. From step 320, the process proceeds to a decision step 330 where it is determined if the type of input is for an NFC device. If the input is for an NFC device, then the program proceeds to a decision step 340 where a determination is made if a second NFC device is detected, such as second wearable device 100 (FIG. 1). If it is not detected, then the program repeatedly loops to the top of decision step 340 until the second NFC device is detected. However, if decision step 340 determines that an appropriate NFC device is detected, than the program proceeds to step 350 in which the information is transferred to the second NFC device, and then the program terminates in terminal 360. However, if decision step 330 determines that the input is not for an NFC device, then the program branches to a decision step 370 where it is determined if the type of input is for a Bluetooth device. If the input is for a Bluetooth device, then the program proceeds to a decision step 380 where a determination is made if a Bluetooth device is detected, such as computing device 10 (FIG. 1). If it is not detected, then the program repeatedly loops to the top of decision step 380 until the Bluetooth device is detected. However, if decision step 380 determines that an appropriate Bluetooth device is detected, then the program proceeds to step 390 in which the information is transferred to the Bluetooth device, and then the program terminates in terminal 360. It can be predetermined whether the type of input is for a Bluetooth device or for a NFC device as demonstrated in FIG. 22.

With reference now to FIG. 23, there is presented a table 390 listing the type of wireless inputs and outputs to and from first wearable device 100 using either Bluetooth or NFC signals as an exemplary. In general, Bluetooth signals are used when there is a greater distance involved, such as from first wearable device 100 to a computing device 10, such as a smart phone. NFC signals are used where the distance is relatively small, such as from one first wearable device 100 to another second wearable device 100 in close proximity thereto (see FIG. 1). Table 390 shows that a GPS signal and information can be sent from first computing device 10 to first wearable device 100 and from first wearable device 100 to smart phone by a Bluetooth signal. Similarly, Bluetooth signals are sent to and received by first wearable device 100 to carry barcode and QR code information, and/or motion information detected from first wearable device 100. On the other hand, business card stored in memory unit 162 can be communicated upon command to a nearby wearable device, such as second wearable device 100 by NFC signals.

Figure 24:
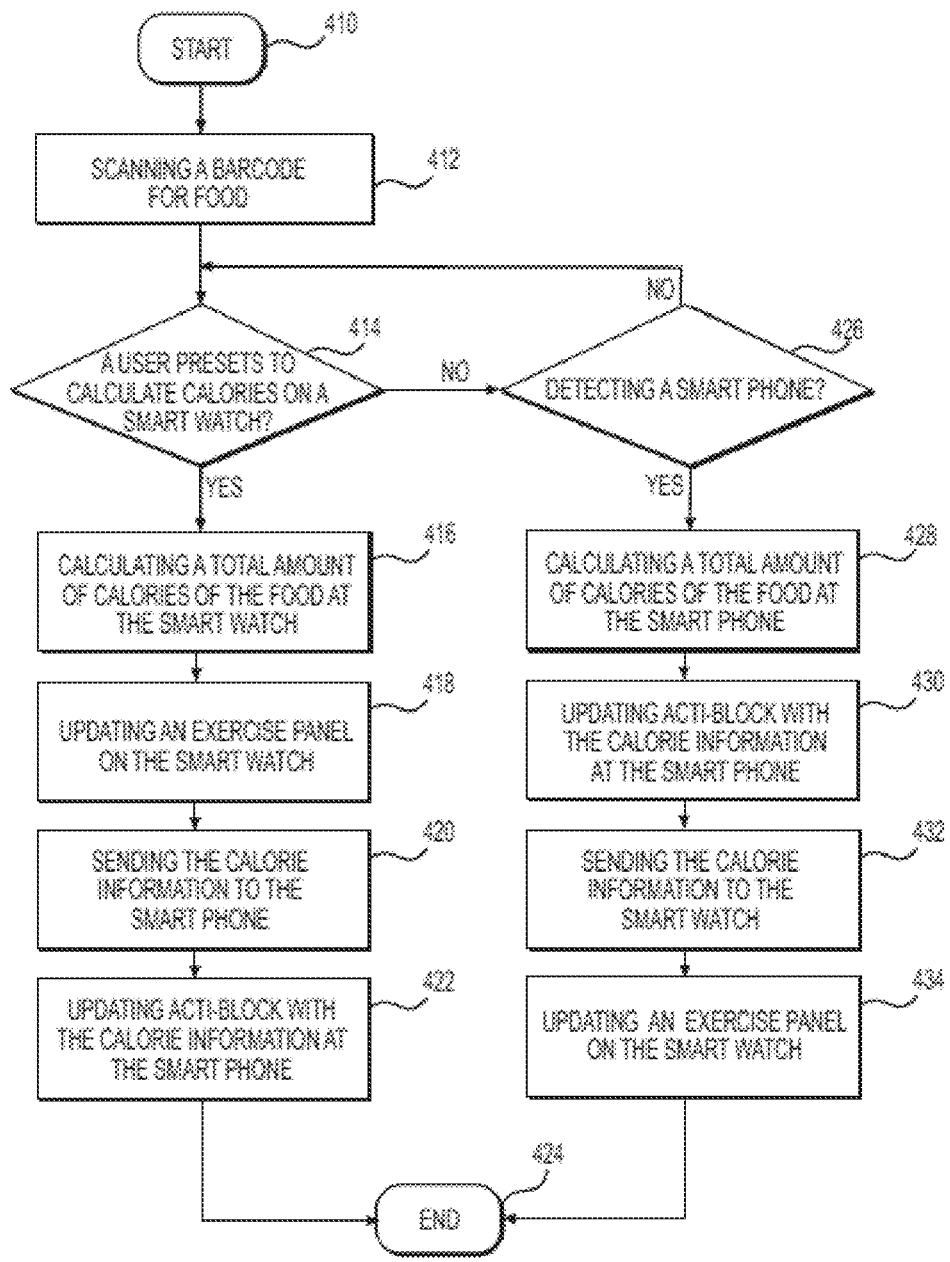
FIG. 24 is a specific schematic flowchart of a subroutine used to scan a barcode for food, calculate calories, and update an associated acti-block and the wearable device.

With reference now to FIG. 24, a subroutine for calculating caloric consumption is depicted. The subroutine begins at a start terminal 410 and then proceeds to a process step 412 to scan a barcode of food that a user will be ingesting. Should the computing capacity at the wearable device be limited, the computing process can be executed at computing device 10 instead of or in addition to that at first wearable device 100. The subroutine proceeds to a decision step 414 where it is determined if the user has preset first wearable device 100 to calculate the calories of the food. If the setting is preset in that way, then the subroutine proceeds to process step 416 in which a calculation of the total calories consumed is made. From step 416 the subroutine then determines in process step 418 the amount of calories burned through exercise by using information about the exercise that is stored on first wearable device 100. In process step 420, the calorie information is sent to computing device 10 in a first computing device 10. In step 422, the acti-block 214 (see FIG. 21) that contains cumulative calorie information is updated, and the subroutine ends at termination terminal 424.

If in decision step 414 it is determined that there is no setting that the calculation is executed on wearable device, then the program branches to a second decision step 426 where it is determined if a first computing device 10 is present. If it is found that there is no first computing device 10 present, then the program loops back to the top of decision step 414. If there is a first computing device 100 present, then the program proceeds to a process step 428 where a calculation of the total amount of calories of the selected food is made at first computing device 10. The program proceeds to process steps 430 and then 432 where the caloric information in the smart phone is updated, and also sent to first wearable device 100, respectively. Then before exiting the subroutine at termination terminal 570, the program updates first dependent screen 172 (See FIGS. 20A, 20B, and 20C) on first wearable device 100 in step 434.

Figure 25:
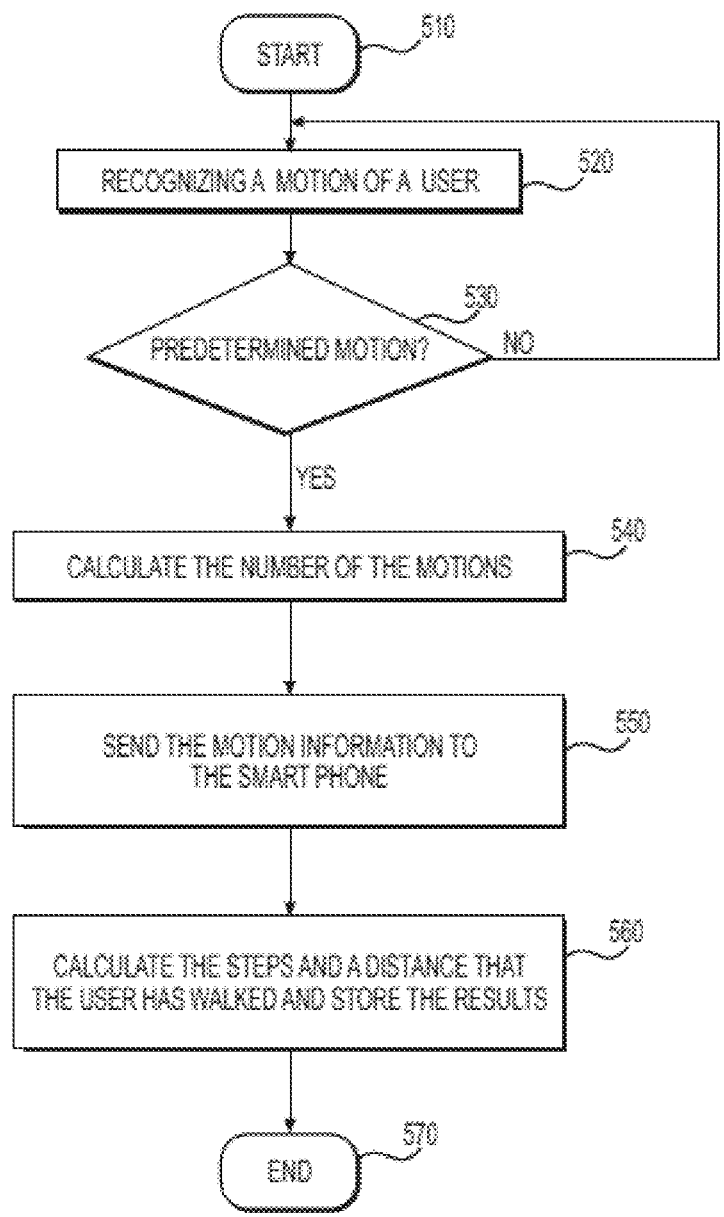
FIG. 25 is a specific schematic flowchart of the subroutine for recognizing and recording motion of the user and storing the result.

With reference now to FIG. 25, a subroutine is disclosed to determine how much exercise a user has had. The subroutine begins in start terminal 510 and proceeds to a process step 620 where the motion of a user is recognized and a determination is made as to what type of motion it is. In the present embodiment, the motions being tracked are those of the wrist on which first wearable device 100 is being worn. But because motion of the wrist and arm of the user will be in synchronization with other motions of the body of the user, such as in running or walking, a fairly accurate determination can be made as to the type of motion being done. For example, by determining the velocity and acceleration of an arm being swung, it can be determined if the user is walking or running. Since the distance can be determined by motion detectors 118 and 119 (by double integrating the measured acceleration), and using the elapsed time, the speed of motion can be determined and the amount of calories, for example, can be determined. Thus, the program proceeds from process step 520 to a decision step 530 where it is determined if the detected motion is one of a predetermined type of motion. If it is not, then the program loops back to the top of step 520 and awaits the recognition of a motion of the user. If the detected motion is of a predetermined type, the program branches to process step 540 where a calculation of the number of motions is made. The subroutine then proceeds to process step 550 and then process step 560 where the motion information is sent to first computing device 10 where the number of steps taken are calculated and the information stored, respectively. From step 560 the subroutine terminates in termination terminal 570.

Figure 26:
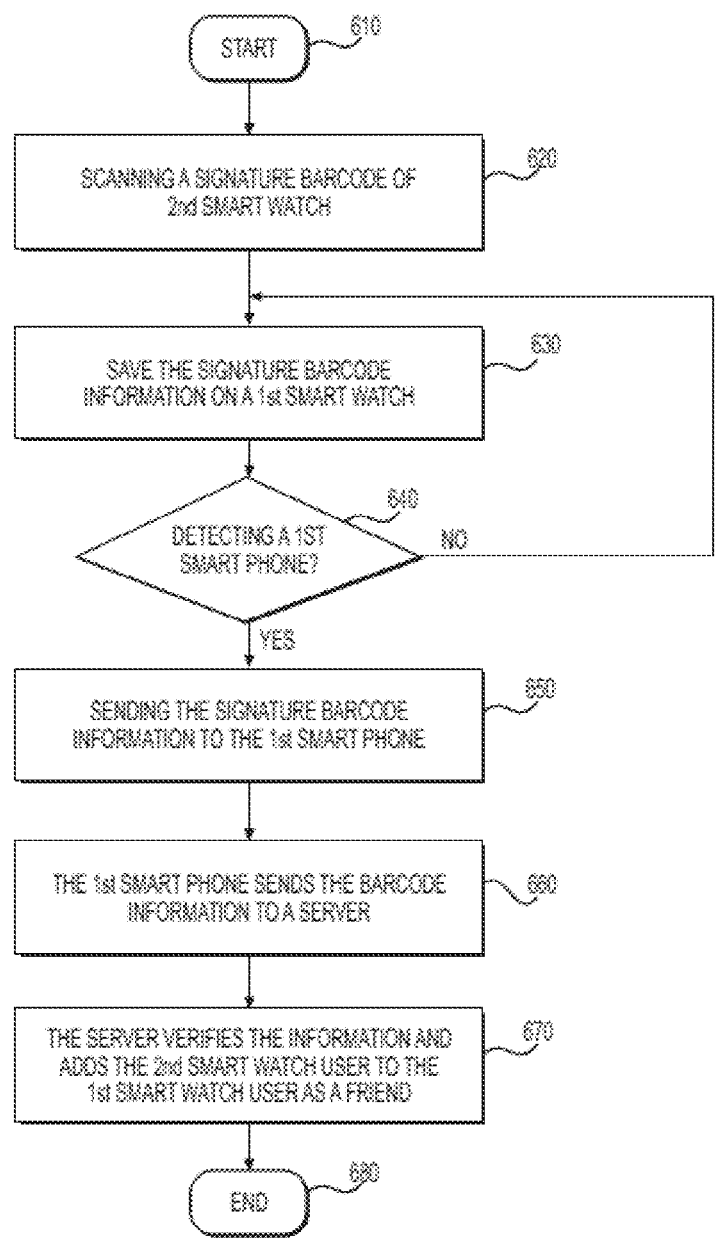
FIG. 26 is a specific schematic flowchart of a subroutine to read, recognize, manage and transmit identifying signature barcode and QR code data from one wearable device (e.g. 100) to a second wearable device (e.g. 200) (See, e.g.
Figure 27:
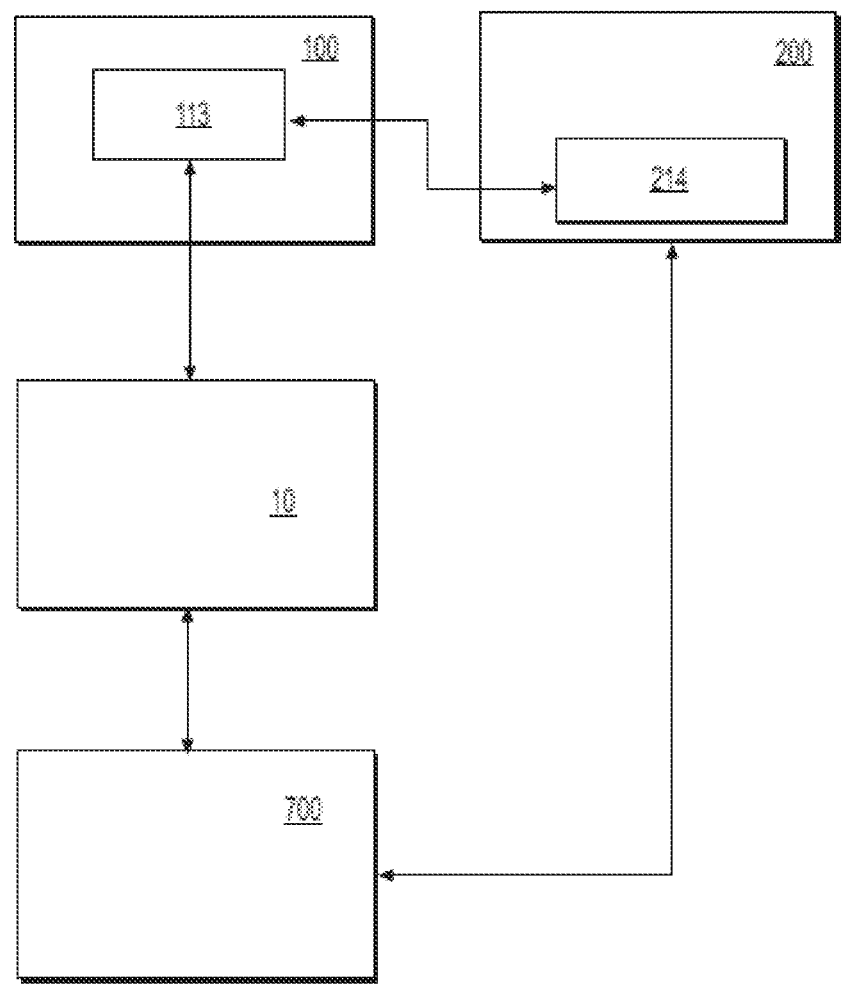
FIG. 27 is a schematic block diagram of the components of a second embodiment of the present disclosure.

With reference now to FIGS. 26 and 27, a process of transferring social information between a first user of a wearable device (e.g. 100) to a second user of a wearable device (e.g. 200), as depicted in FIGS. 1 and 27, is depicted in the disclosed subroutine and hardware block diagram. The social information can be for example information that is contained on a business card. This would include such information as name, title, business or company name, business address, business telephone and facsimile numbers, email address, Skype name and Instant Messenger name. This information is stored in a signature barcode 114 or in wearable device memory unit 162 through an earlier input operation from first computing device 10 or other computer connection. It can also be obtained from a social media network web sites such as Facebook, Linkin, and Twitter.

The subroutine of FIG. 26 begins in start terminal 610 and proceeds to step 620 where the signature barcode 214 of second wearable device 100 (of the presumed second user) is read by the barcode scanner 113 of first wearable device 100 of the first user. Then the program proceeds to process step 630 wherein the signature barcode information is saved on first first wearable device 100. From step 630, the program proceeds to a decision step 640 wherein it is determined if the computing device 10 of the first user can be found. If no first computing device 10 can be found, program loops back to the beginning of step 630. If a first computing device 10 is detected, the program proceeds to process step 650 where the signature barcode information is sent to computing device 10 of the first user. Then the program proceeds to process step 660 wherein the barcode information is sent to the server 700 (FIG. 27). From server 700, the new "friend" is added to one or more appropriate social networks, or a network provided by the present disclosure. From step 660, the program proceeds to process step 670 and then to termination terminal 680. In process step 670 server 700 verifies and authenticates the information and adds the second smart phone user 200 to the wearable device of the friend.

The schematic of a hardware configuration that illustrates the operation of the subroutine in FIG. 26 is depicted in FIG. 27. Barcode scanner 113 of the first user reads the signature barcode 214 of the second wearable device 100 of the second user through a scanning process. First first wearable device 100 is connected through a Bluetooth connection to the first computing device 10 of the first user, which in turn is connected by an internet connection (e.g. a wireless connection) to a server 700. Server 700 uploads the information to a designate web site. Obviously, server 700 is representative and could include other well known alternatives, such as cloud computing.

Figure 28:
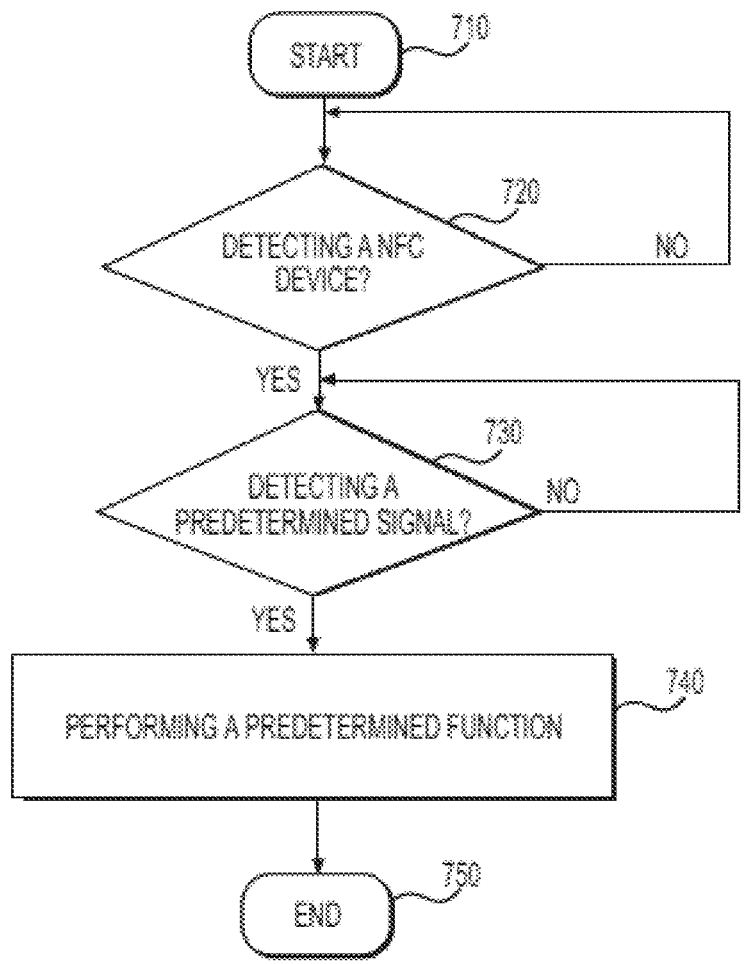
FIG. 28 is a specific schematic flowchart of a subroutine to communicate with another NFC (Near Field Communications) device.

With reference now to FIG. 28, a subroutine that implements a level of security is depicted. The subroutine starts in start terminal 710 and proceeds to a decision step 720 where the presence of an NFC (Near Field Communications) device is determined. An NFC device is one that communicates to another NFC device using weak electromagnetic radiation and the NFC protocol over a very short distance from actual touching to a few inches. A smart phone uses NFC to communicate such information as business cards, photographs, and small files to another smart phone. If an NFC device is detected, the program branches to a second decision step 730 which inquires if the NFC device detects a predetermined signal. One such signal can be a password or predetermined gestures such as handshake. If an NFC device is not detected, the program loops back to the top of decision step 720 to await the receipt of an indication that an NFC device is present. In a similar manner, if a predetermined signal is not detected in decision step 730, the program loops back to the top of decision step 730. If a predetermined signal is detected, the program proceeds to a process step 740 where a predetermined function is performed. An example of such a function would be to check that a transmitted password is acceptable and to allow communication between the two devices. From process step 740 the program exits the subroutine through a termination terminal 750.

Figure 29:
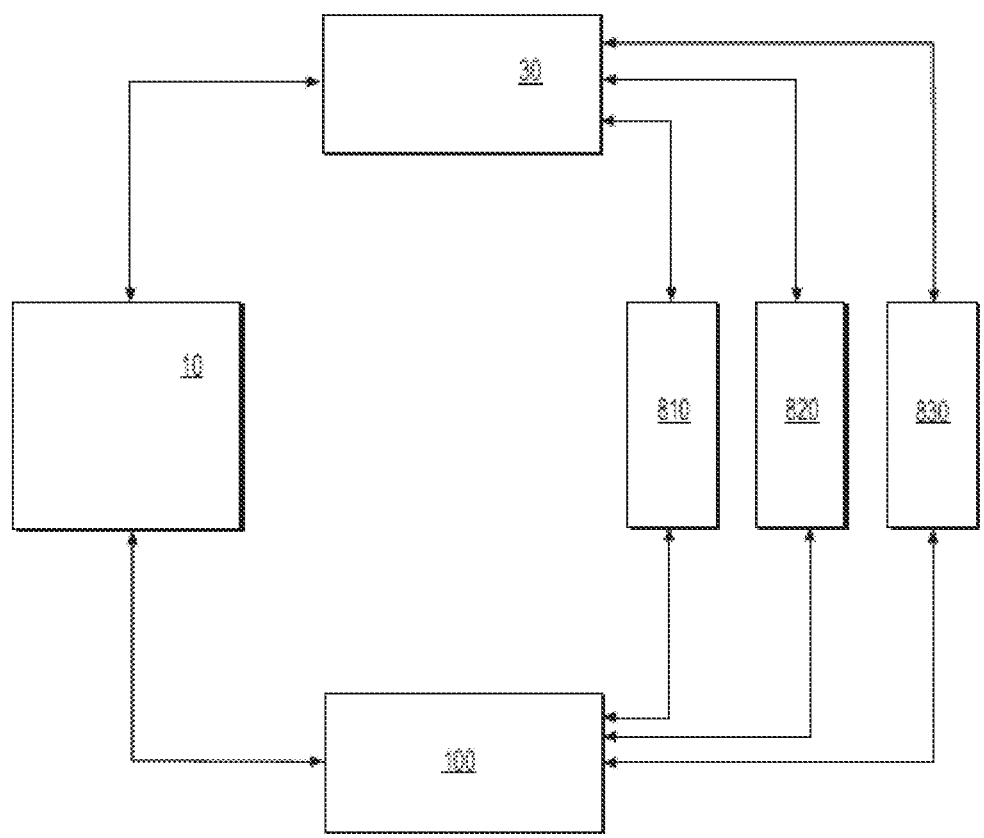
FIG. 29 is a schematic block diagram of different components that can be linked and joined to a wearable device.

A multi-use for a first wearable device 100 utilizing the same or universal key or password for several different types of devices is depicted in FIG. 29, first wearable device 100 is bidirectionally connected using Bluetooth to a first computing device 10, which could in alternative embodiments also be a general purpose, programmed computer system. In addition, first wearable device 100 is bidirectionally connected using NFC, a scanner or Bluetooth to one of several types of transceivers. For example, wearable device is shown connected to a transceiver 810 that operates a door, to a transceiver 820 that controls several functions of an automobile (e.g. rolling down the windows, starting the car, or turning on the heat or air conditioner), and to a transceiver 830 that controls the operation of a copier. Thus, each of these devices can be controlled by a single wearable device code. Each of transceivers 810, 820, and 830 is bidirectionally connected using wireless network to a server 30, which is also bidirectionally connected using Bluetooth to first computing device 10. The user can use first wearable device 100 as an universal key for several different types of devices. In a case that the user lost first wearable device 100, the user can change the password for first wearable device 100 on server 30.

Figure 30:
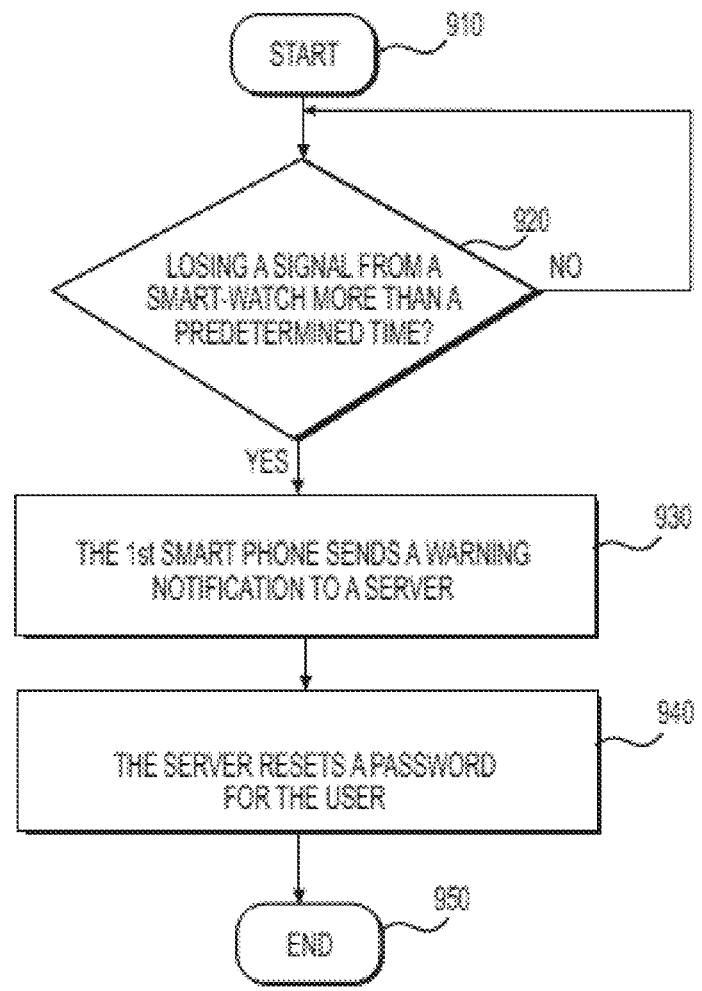
FIG. 30 is a specific schematic flowchart of a subroutine to manage lost communications between a plurality of devices.

With reference now to FIG. 30, a subroutine for monitoring a wearable device is depicted. The subroutine begins in a start terminal 910 and immediately goes to a decision step 920 that determines the time from the last status signal to the present and determines if a signal from wearable device is more than a predetermined amount. If the minimum time since the last signal is longer than a predetermined amount, the program proceeds to a process step 930 in which computing device 10 or first wearable device 100 sends a warning signal to a server. The program then proceeds to a process step 940 in which the user's password is reset or changed, and then to termination terminal.

Figure 31:
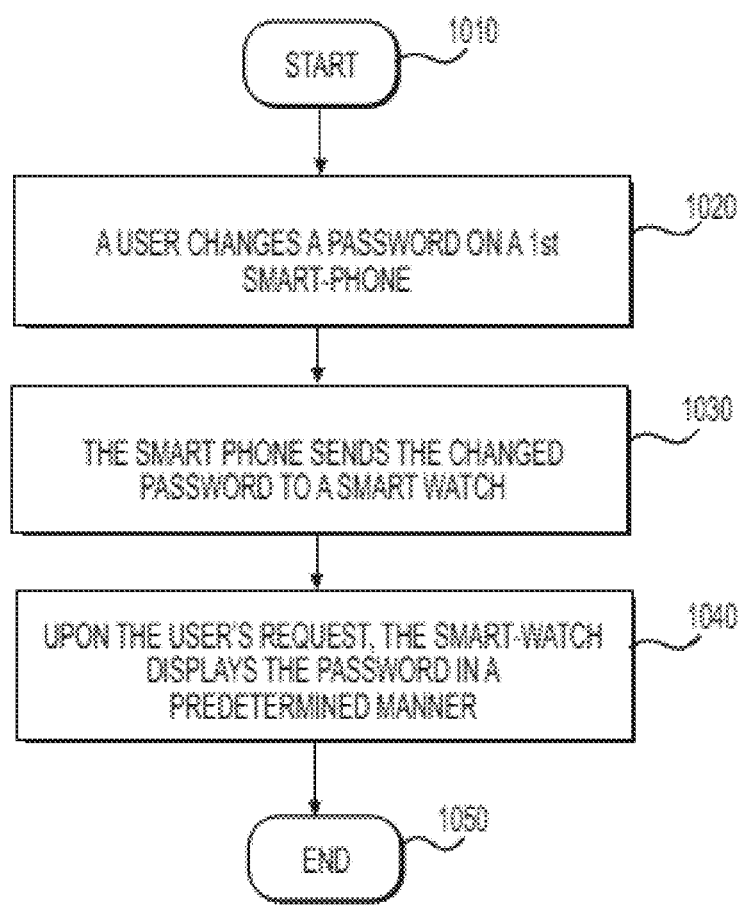
FIG. 31 is a specific schematic flowchart of a subroutine used to change a password of a wearable device and to communicate the changed password to other units.

With reference to FIG. 31, a subroutine for voluntarily or manually changing a password is depicted. The subroutine begins in a start terminal 1010 and immediately goes to a decision step 1020 where a user has voluntarily changed a password on first computing device 10. The program then proceeds to a process step 1030 in which start phone 10 sends the changed password to first wearable device 100. From step 1030 the program proceeds to a process step 1040 in which the user is given an opportunity to display the new password in a pre-determined manner, such as a barcode or a QR code. The program then terminates in a termination terminal 1050. Thus, first wearable device 100 can display a barcode or a QR code on display assembly 130 so that the barcode scanner 213 of another second wearable device 100 can read and scan the barcode or QR code on the wearable device's 100 display assembly. According to the present disclosure, first wearable device 100 does not need to carry a physical barcode or QR code.

Figure 32:
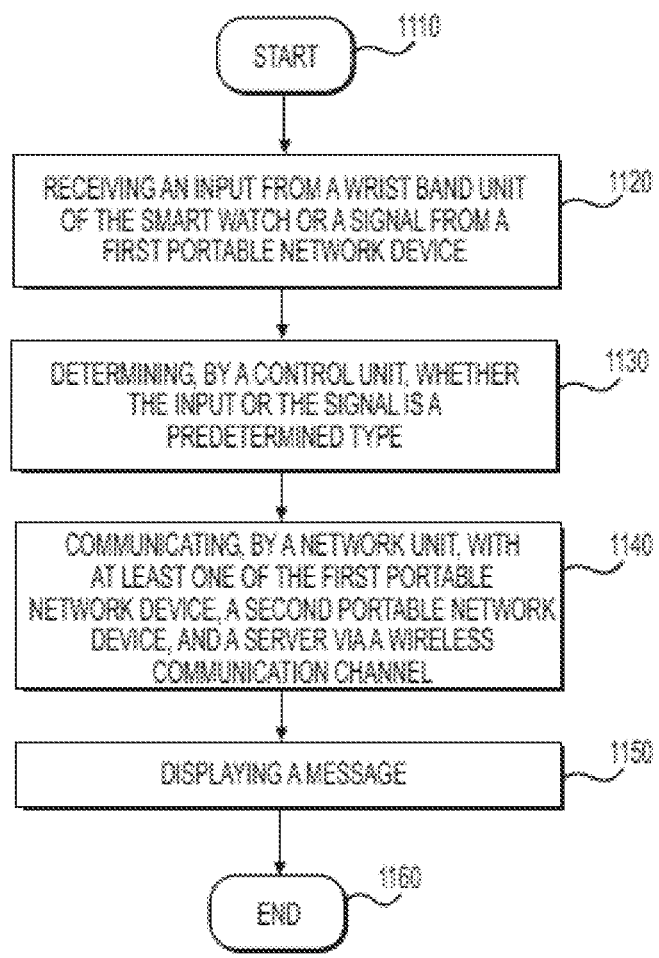
FIG. 32 is a schematic flowchart of a subroutine to display a message.

According to a predetermined setting, first wearable device 100 can transfer information either to another second wearable device 100 (see FIG. 1) or computing device 10. With reference now to FIG. 32, a subroutine for general procedure for operating a wearable device is depicted. The subroutine begins at a start terminal 1110 and proceeds to a step 1120 where the processor receives an input from a wrist band unit of the wearable device or a signal from a first portable network device. From step 1120, the process proceeds to a decision step 1130, where control unit 140 (FIG. 1) determines whether the input or the signal is a predetermined type. From step 1130, the process proceeds to a communication step 1140, where a network unit communicates with at least one of the first portable network devices, a second portable network device, and a server via a wireless communication channel. From step 1140, the process proceeds to a displaying step 1150, where the display assembly 130 displays a message. From step 1150, the process proceeds to end terminal 1160.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

What is claimed:

1. A convertible handheld reader device comprising:
   a network assembly comprising a network component and a computing component;
   at least one reader coupled to the computing component and reading at least one of a barcode or Radio-frequency identification (RFID);
   a wearable wrist band unit having a first wrist band unit and a second wrist band unit, wherein each of the first wrist band unit and the second wrist band unit is coupled to the network assembly, the first wrist band unit is extended in a different direction from the second wrist band unit,
   wherein the first wrist band unit has an attachment component and the attachment component is detachably attached to one of the network assembly and the second wrist band unit, and wherein, when the attachment component is attached to one of the network assembly and the second wrist band unit, a structure of the first wrist band, the network assembly, and the second wrist band is converted from a wearable position to a handheld position.

2. The convertible handheld reader device of claim 1, wherein the network assembly is detachably attached to the wearable wrist band unit.

3. The convertible handheld reader device of claim 1, wherein the network assembly is rotatably attached to the wearable wrist band unit.

4. The convertible handheld reader device of claim 3, wherein the at least one reader wirelessly communicates with the network assembly.

5. The convertible handheld reader device of claim 3, wherein the at least one reader has a holder, and wherein a user holds the at least one reader on a user's finger with the holder.

6. The convertible handheld reader device of claim 5, wherein the at least one reader automatically recognizes a barcode when the at least one reader reads the barcode.

7. The convertible handheld reader device of claim 5, wherein the at least one reader automatically recognizes a barcode when the at least one reader reads the barcode for a predetermined period of time.

8. The convertible handheld reader device of claim 1, wherein the at least one reader is detachably attached to the network assembly.

9. The convertible handheld reader device of claim 1, wherein the wearable wrist band unit has a button to activate the at least one reader.

10. The convertible handheld reader device of claim 1, wherein the first wrist band unit is disposed to face the at least one reader and the first wrist band unit has an opening corresponding to the at least one reader.

11. The convertible handheld reader device of claim 1, wherein the attachment component is detachably attached to the network assembly to form a loop that a user can put a finger therein.

12. The convertible handheld reader device of claim 1, wherein the attachment component is detachably attached to a middle of the second wrist band unit.

13. The convertible handheld reader device of claim 1, wherein the at least one reader comprises at least one first reader and at least one second reader, and wherein the at least one first reader is disposed at the network assembly and the at least one second reader is disposed at the wearable wrist band unit.

14. The convertible handheld reader device of claim 1, wherein the at least one reader comprises a plurality of readers, and wherein the plurality of readers are disposed at the network assembly.

15. The convertible handheld reader device of claim 1, wherein the at least one reader comprises a plurality of readers, and wherein the plurality of readers are disposed at the wearable wrist band unit.

16. The convertible handheld reader device of claim 1, wherein the at least one reader comprises a plurality of three-dimensional scanners.

17. The convertible handheld reader device of claim 1, wherein the at least one reader is disposed to face in a tangential direction to a surface of the wrist band unit.

18. The convertible handheld reader device of claim 1, wherein each and every one of the first wrist band, the network assembly, and the second wrist band defines the convertible handheld reader device in a handgun-shape.

19. A convertible handheld reader device comprising:
   a network assembly comprising a network component and a computing component;
   at least one reader coupled to the computing component and reading at least one of barcode or RFID;
   a wearable wrist band unit having a first wrist band unit and a second wrist band unit, wherein the first wrist band unit is extended in opposite direction from the second wrist band unit, and accommodates the network assembly, wherein the at least one reader is detachably attached to the network assembly, wherein the at least one reader wirelessly communicates with the network assembly, and wherein the at least one reader has a holder that a user holds the at least one reader on a user's finger wherein the first wrist band unit has an attachment component and the attachment component is detachably attached to one of the network assembly and the second wrist band unit, and wherein, when the attachment component is attached to one of the network assembly and the second wrist band unit, a structure of the first wrist band, the network assembly, and the second wrist band is converted from a wearable position to a handheld position.

20. The convertible handheld reader device of claim 19, wherein the computing component comprises a memory and a processor, and wherein the network component has an internet connection unit.

* * * * *